(12) United States Patent
Unohara et al.

(10) Patent No.: US 9,938,407 B2
(45) Date of Patent: Apr. 10, 2018

(54) POLYARYLENE SULFIDE RESIN COMPOSITION

(71) Applicant: Toray Industries, Inc., Tokyo (JP)

(72) Inventors: Takeshi Unohara, Nagoya (JP); Hideki Matsumoto, Nagoya (JP); Kei Saitoh, Nagoya (JP); Kenichi Okunaga, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 15/024,748

(22) PCT Filed: Sep. 25, 2014

(86) PCT No.: PCT/JP2014/075418
§ 371 (c)(1),
(2) Date: Mar. 24, 2016

(87) PCT Pub. No.: WO2015/046324
PCT Pub. Date: Apr. 2, 2015

(65) Prior Publication Data
US 2016/0244612 A1    Aug. 25, 2016

(30) Foreign Application Priority Data
Sep. 27, 2013  (JP) ................. 2013-201410

(51) Int. Cl.
C08G 75/02  (2016.01)
C08L 81/04  (2006.01)
C08L 23/02  (2006.01)
C08K 5/5419  (2006.01)
C08K 7/14  (2006.01)

(52) U.S. Cl.
CPC ............ C08L 81/04 (2013.01); C08K 5/5419 (2013.01); C08K 7/14 (2013.01); C08L 23/02 (2013.01)

(58) Field of Classification Search
None
See application file for complete search history.

(56) References Cited

U.S. PATENT DOCUMENTS

| | | |
|---|---|---|
| 5,331,029 A | 7/1994 | Sato et al. |
| 6,080,822 A | 6/2000 | Haubs et al. |
| 2011/0124825 A1 | 5/2011 | Konno et al. |
| 2013/0059976 A1 | 5/2013 | Matsuo et al. |
| 2013/0225771 A1 | 8/2013 | Kanomata et al. |
| 2013/0323447 A1* | 12/2013 | Feng ............... B29C 49/0005 428/36.4 |

FOREIGN PATENT DOCUMENTS

| | | |
|---|---|---|
| EP | 0 495 457 | 7/1992 |
| EP | 2 053 074 | 4/2009 |
| JP | 04-018422 | 1/1992 |
| JP | 04-159365 | 6/1992 |
| JP | 04-372624 | 12/1992 |
| JP | 05-502055 | 4/1993 |
| JP | 05-170907 | 7/1993 |
| JP | 05-186688 | 7/1993 |
| JP | 08-208849 | 8/1996 |
| JP | 08-283413 | 10/1996 |
| JP | 2001-279097 | 10/2001 |
| JP | 2008-127532 | 6/2008 |
| JP | 2008-163112 | 7/2008 |
| JP | 2008-214383 | 9/2008 |
| JP | 2008-247955 | 10/2008 |
| JP | 2011-149008 | 8/2011 |
| JP | 2012-177015 | 9/2012 |
| JP | 2013-10908 | 1/2013 |

OTHER PUBLICATIONS

NPL, Algilent Technologies, Polymer Molecular Weight Distribution and Definitions of MW Averages, p. 1-4.*
Supplementary European Search Report dated Mar. 22, 2017, of corresponding European Application No. 14849883.5.

* cited by examiner

*Primary Examiner* — Robert T Butcher
(74) *Attorney, Agent, or Firm* — DLA Piper LLP (US)

(57) ABSTRACT

A polyarylene sulfide resin composition includes: (A) a polyarylene sulfide resin having a carboxyl group content of more than 100 μmol/g and less than 400 μmol/g, and also having a weight average molecular weight of 10,000 or more and less than 100,000; and (B) a filler. The polyarylene sulfide resin composition has improved mechanical properties and chemical resistance while maintaining intrinsic high melting point of a polyarylene sulfide.

13 Claims, No Drawings

POLYARYLENE SULFIDE RESIN COMPOSITION

TECHNICAL FIELD

This disclosure relates to a polyarylene sulfide resin composition having significantly improved mechanical properties and chemical resistance while maintaining intrinsic high melting point of polyarylene sulfide.

BACKGROUND

Polyarylene sulfide (hereinafter abbreviated to PAS) represented by polyphenylene sulfide (hereinafter abbreviated to PPS) has excellent properties as an engineering plastic such as excellent heat resistance, barrier property, chemical resistance, electric insulation properties, and moisture heat resistance, and are used mainly for injection and extrusion molding applications, for example, various electrical and electronic components, mechanical components, automobile components, films, fibers and the like.

Of these, in injection molding applications, a filler is often added to produce various properties such as increase in strength and improvement in electrical properties. Particularly, for the purpose of increasing strength, addition of reactive compounds such as coupling agents together with a filler is widely known to maximize the reinforcement effects. However, in the reaction of dichlorobenzene with a sulfidizing agent, which is a general method of producing PPS, a typical example PAS, the main chain backbone has a benzene ring and sulfur as main components and has no sufficient functional group, and thus there were limitations on improving the reinforcement effects of a filler by adding reactive compounds such as coupling agents. Although PAS itself is a polymer having excellent chemical resistance, its resin composition has a problem that the mechanical properties significantly decrease after a chemical treatment since the filler has low adhesiveness.

Therefore, Japanese Unexamined Patent Publication (Kokai) No. 2001-279097 (Claims) discloses improvement in mechanical properties by selectively using PAS having a specific carboxyl group.

Japanese Unexamined Patent Publication (Kokai) No. 5-170907 (Claims) discloses a producing method in which a denaturating agent selected from compounds having a carboxyl group, a mercapto group, or a disulfide group at the same time in the molecule is reacted during melt kneading to prepare PPS having a carboxyl group, to improve the physical properties by introducing a reactive functional group into PPS.

Japanese Unexamined Patent Publication (Kokai) No. 4-018422 (Claims) and Japanese Unexamined Patent Publication (Kokai) No. 4-372624 (Claims) disclose a method of introducing a carboxyl group by thermally reacting an amino group-containing PAS prepared in advance with phthalic acid chloride or acid anhydride, aiming to improve the adhesiveness to metals and the compatibility with other polymers.

However, in the method according to Japanese Unexamined Patent Publication (Kokai) No. 2001-279097 (Claims), only PAS having poor mechanical properties was obtained because of a small amount of carboxyl groups.

In the method according to Japanese Unexamined Patent Publication (Kokai) No. 5-170907 (Claims), the amount of introduction of carboxyl groups is unknown, and properties such as mechanical properties are not disclosed at all, and thus it is difficult to produce the amount of carboxyl groups necessary for significant improvement in mechanical properties and chemical resistance. Furthermore, the absorption peak derived from carboxyl groups in the FT-IR spectrum disclosed is very small, and it is speculated that almost no carboxyl group is introduced.

However, in the methods according to Japanese Unexamined Patent Publication (Kokai) No. 4-018422 (Claims) and Japanese Unexamined Patent Publication (Kokai) No. 4-372624 (Claims), it is expected that a melting point decreases since the side chain having introduced carboxyl groups is bulky, and it is speculated that a resin composition using the PAS is not suitable for applications requiring heat resistance. A decrease in melting point, namely low crystallinity may lead to deterioration of mechanical properties and chemical resistance.

SUMMARY

We found that mechanical properties and chemical resistance are significantly improved in a PAS resin composition using PAS and a specific carboxyl group content and a filler. We thus provide:

A polyarylene sulfide resin composition including:
(A) a polyarylene sulfide resin having a carboxyl group content of more than 100 µmol/g and less than 400 µmol/g, and also having a weight average molecular weight of 10,000 or more and less than 100,000; and
(B) a filler.

It is possible to obtain a polyarylene sulfide resin composition having significantly improved mechanical properties and chemical resistance while maintaining intrinsic high melting point of a polyarylene sulfide.

DETAILED DESCRIPTION

PAS is a homopolymer or a copolymer including a repeating unit of the formula —(Ar—S)— as a main structural unit. Here, "including as a main structural unit" means inclusion of 80 mol % or more of the repeating unit among all structural units constituting PAS. Examples of Ar include any of units represented by formulae (A) to (K), and a unit represented by the formula (A) is particularly preferable.

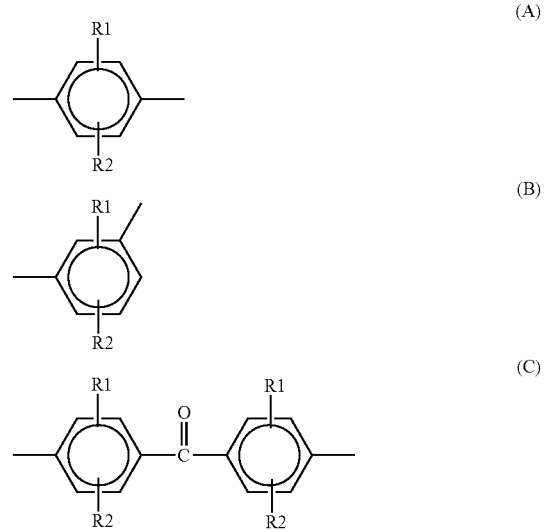

-continued

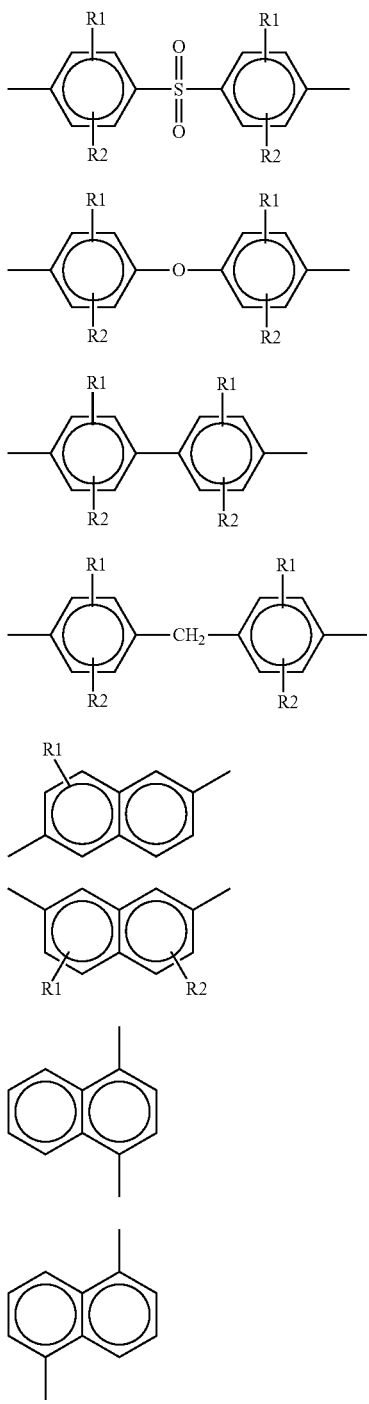

R1 and R2 are substituents selected from hydrogen, an alkyl group, an alkoxy group, a halogen group, and a carboxyl group, and R1 and R2 may be the same or different.

As long as this repeating unit is included as a main structural unit, a small amount of branch units or cross-linking units represented by formulae (L) to (N) and the like can be included. The amount of copolymerization of these branch units or cross-linking units is preferably within a range of 0 to 1 mol % based on 1 mol of the unit —(Ar—S)—.

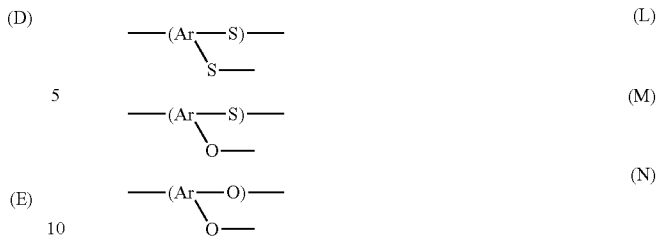

PAS may be any of a random copolymer or a block copolymer including the above repeating unit or a mixture thereof.

Inclusion of preferably 90 mol % or more, more preferably 95 mol % or more, and still more preferably 98 mol % or more of the p-arylene sulfide unit in the formula (A), as a repeating unit of PAS, is preferable for maintaining intrinsic high melting point of PAS. Less than 90 mol % of the p-arylene sulfide unit, namely many o-arylene sulfide units or m-arylene sulfide units, is not preferable since intrinsic high melting point of PAS decreases and mechanical properties also may deteriorate.

Typical examples of PAS include polyphenylene sulfide, polyphenylene sulfide sulfone, polyphenylene sulfide ether, polyphenylene sulfide ketone, and a random copolymer and a block copolymer thereof, and a mixture thereof. Particularly preferable PAS includes polyphenylene sulfide including 90 mol % or more, preferably 95 mol % or more, and more preferably 98 mol % or more of a p-phenylene sulfide unit:

$$+\!\!\left\langle\bigcirc\right\rangle\!\!-\!\!S\!\!+\!\!$$

as a main structural unit of a polymer.

A carboxyl group contained in PAS may be introduced into an arylene sulfide unit constituting the main backbone of PAS, or may be introduced into an aryl sulfide unit constituting the terminal. The carboxyl group may have a structure directly bound to an arylene sulfide unit or an aryl sulfide unit, or may have a structure indirectly bound to an arylene sulfide unit or an aryl sulfide unit via an amino group, an amide group, an ester group, an imide group, an alkyl group, an alkoxy group, or a phenylene group. However, if a carboxyl group in the arylene sulfide unit of PAS has a structure indirectly bound via an amino group, an amide group, an ester group, an imide group, an alkyl group, an alkoxy group, or a phenylene group, components that are bulky for the main chain of PAS are introduced as a side chain, leading to decrease in melting point or deterioration of mechanical properties. Therefore, a structure in which a carboxyl group is directly bound to the arylene sulfide unit of PAS, or a structure in which a carboxyl group is directly or indirectly bound to the aryl sulfide unit constituting the terminal of PAS is preferable. Of arylene sulfide units to which a carboxyl group is directly bound, a unit constituting a p-phenylene sulfide unit such as a 2,5-benzoic acid sulfide unit is more preferable from the viewpoint of high melting point and excellent mechanical properties.

There is a need for the resin composition to contain PAS having a carboxyl group content of more than 100 μmol/g and less than 400 μmol/g. From the viewpoint of high melting point and excellent mechanical properties, a structure in which a carboxyl group is directly bound to the arylene sulfide unit or the aryl sulfide unit of PAS is preferably 80 μmol/g or more and less than 380 μmol/g, and more preferably 100 μmol/g or more and less than 300 μmol/g in all carboxyl groups. A structure in which a carboxyl group is indirectly bound to the arylene sulfide unit or the aryl sulfide unit of PAS via an amino group, an amide group, an ester group, an imide group, an alkyl group, an alkoxy group, or a phenylene group is preferably smaller in amount from the viewpoint of high melting point and excellent mechanical properties, but is practically preferably less than 90 μmol/g, and more preferably less than 50 μmol/g.

(A) A PAS resin, (B) a filler, (C) an olefin-based copolymer, (D) an alkoxysilane compound, and (E) other additives used for the PAS resin composition will be described below.

(A) PAS Resin

A PAS resin used for a polyarylene sulfide resin composition is a PAS resin having a carboxyl group content of more than 100 μmol/g and less than 400 μmol/g, and also having a weight average molecular weight of 10,000 or more and less than 100,000. The PAS resin can be prepared by a polymerization reaction. Hereinafter, a description will be made of a sulfidizing agent, an organic polar solvent, a dihalogenated aromatic compound, a monohalogenated compound, a polymerization auxiliary, a branching agent and cross-linking agent, a molecular weight modifier, a polymerization stabilizer, a dehydration step, a polymerization step, polymer recovery, and a produced PAS to be used for polymerization of PAS, in this order.

(A-1) Sulfidizing Agent

Examples of the sulfidizing agent include alkali metal sulfide, alkali metal hydrosulfide, and hydrogen sulfide. From the viewpoint of handleability and general versatility, and the like, alkali metal sulfide, alkali metal hydrosulfide, and a mixture thereof are preferably used. The sulfidizing agent can be used as a hydrate or an aqueous mixture, or in the form of an anhydride. It is also possible to use a sulfidizing agent prepared in situ in the reaction system from alkali metal hydrosulfide and alkali metal hydroxide.

Examples of preferable sulfidizing agent include sodium sulfide and sodium hydrosulfide, and they are preferably used in the form of aqueous mixture from the viewpoint of handleability.

In the following description, when the sulfidizing agent is partially lost before initiation of a polymerization reaction by a dehydration operation mentioned below and the like, the amount of the sulfidizing agent means the residual amount obtained by subtracting the lost amount from the charge amount.

When the alkali metal hydrosulfide is used as the sulfidizing agent, it is particularly preferred to simultaneously use the alkali metal hydroxide. The amount of the alkali metal hydroxide to be used is preferably 90 mol or more and less than 120 mol, more preferably 95 mol or more and less than 115 mol, and still more preferably 95 mol or more and less than 110 mol, based on 100 mol of the alkali metal hydrosulfide. When the amount is within the above range, PAS having a small amount of polymerization by-products can be obtained without causing decomposition.

(A-2) Organic Polar Solvent

An organic polar solvent is used as a polymerization solvent. Specifically, it is possible to preferably use N-alkylpyrrolidones such as N-methyl-2-pyrrolidone and N-ethyl-2-pyrrolidone; caprolactams such as N-methyl-ε-caprolactam; aprotic organic solvents such as 1,3-dimethyl-2-imidazolidinone, N,N-dimethylacetamide, N,N-dimethylformamide, hexamethylphosphoric triamide, dimethyl sulfone, and tetramethylene sulfoxide; and a mixture thereof because of high stability of the reaction. Of these, N-methyl-2-pyrrolidone (NMP) is used particularly preferably.

There is no particular limitation on the amount of the organic polar solvent to be used as a polymerization solvent of PAS, and the amount is preferably 250 mol or more and less than 550 mol, more preferably 250 mol or more and less than 500 mol, and still more preferably 250 mol or more and less than 450 mol, based on 100 mol of the sulfidizing agent from the viewpoint of stable reactivity and economy.

(A-3) Dihalogenated Aromatic Compound

In the production of PAS, a dihalogenated aromatic compound is used as a raw material. In the production of PPS, which is a typical example of PAS, since a benzene ring and sulfur serve as the main backbone of a polymer, examples of the dihalogenated aromatic compound to be used include dihalogenated benzenes such as p-dichlorobenzene, m-dichlorobenzene, o-dichlorobenzene, and p-dibromobenzene. To introduce a carboxyl group, use of dihalogenated aromatic compounds having a carboxyl group such as 2,4-dichlorobenzoic acid, 2,5-dichlorobenzoic acid, 2,6-dichlorobenzoic acid, and 3,5-dichlorobenzoic acid, and a mixture thereof as a copolymerized monomer is also one of the preferred aspects. Furthermore, as long as the desired effects are not impaired, it is also possible to use dihalogenated aromatic compounds such as 2,4-dichloroaniline, 2,5-dichloroaniline, 2,6-dichloroaniline, 3,5-dichloroaniline, 2,4-dichlorophenol, 2,5-dichlorophenol, 2,6-dichlorophenol, 3,5-dichlorophenol, 1-methoxy-2,5-dichlorobenzene, 4,4'-dichlorophenyl ether, 4,4'-dichlorodiphenyl sulfoxide, and 4,4'-dichlorophenyl ketone. Of these, use of p-dihalogenated benzene such as p-dichlorobenzene as a main component is preferable. Use of some of dihalogenated benzoic acid represented by 2,4-dichlorobenzoic acid and 2,5-dichlorobenzoic acid as a copolymerization component is also one of the preferred aspects, and from the viewpoint of maintaining high melting point, 2,5-dichlorobenzoic acid is a more preferable copolymerization component.

The amount of the dihalogenated aromatic compound to be used is preferably 80 mol or more and less than 150 mol, more preferably 90 mol or more and less than 110 mol, and still more preferably 95 mol or more and less than 105 mol, based on 100 mol of the sulfidizing agent from the viewpoint of inhibition of decomposition and efficient obtainment of PAS having a viscosity suitable for processing. If the amount of the dihalogenated aromatic compounds is less than 80 mol, based on 100 mol of the sulfidizing agent, PAS thus obtained may be decomposed. If the amount of the dihalogenated aromatic compound is 150 mol or more based on 100 mol of the sulfidizing agent, the molecular weight of PAS thus obtained may decrease, leading to deterioration of mechanical properties or chemical resistance. When a dihalogenated aromatic compound having a carboxyl group is used as a copolymerization component, the amount of the dihalogenated aromatic compound having a carboxyl group to be used is preferably 0.1 mol or more and less than 20 mol, more preferably 1 mol or more and less than 15 mol, and still more preferably 2 mol or more and less than 10 mol, based on 100 mol of the sulfidizing agent in the total amount of the dihalogenated aromatic compound. If the amount of the dihalogenated aromatic compound having a carboxyl group is less than 0.1 mol, based on 100 mol of the sulfidizing agent, the amount of a carboxyl group of PAS thus obtained decreases. If the amount of the dihalogenated aromatic compound having a carboxyl group is 20 mol or more based on 100 mol of the sulfidizing agent, the molecular weight of PAS thus obtained may decrease, leading to deterioration of mechanical properties or chemical resistance.

When the dihalogenated aromatic compound having a carboxyl group is used, there is no particular limitation of timing of the addition thereof, and they may be added at any time point of during the dehydration step, at the initiation of the polymerization, or in the middle of the polymerization as mentioned below, or may be added plural times. In an addition during the dehydration step, there is a need to use a reflux device which does not cause vaporization of the dihalogenated aromatic compound having a carboxyl group during the dehydration step. In an addition in the middle of polymerization (under an increased pressure), an injection device is required, and since the dihalogenated aromatic compound having a carboxyl group reacts in the middle of the polymerization, the dihalogenated aromatic compound having a carboxyl group is not completely consumed at the completion of the polymerization and remain in the polymerization system, and the amount of introduction of a carboxyl group into PAS decreases, and thus excellent mechanical properties and chemical resistance are unlikely to be exhibited. Therefore, the dihalogenated aromatic compound having a carboxyl group is preferably added at the timing when a conversion ratio of the dihalogenated aromatic compound is less than 80%, more preferably less than 70%, and still more preferably added at the timing between after the completion of the dehydration step and the initiation of the polymerization, and most preferably at the initiation of the polymerization, namely addition simultaneously with the dihalogenated aromatic compound.

(A-4) Monohalogenated Compound

In the production of PAS, the addition of the monohalogenated compound having a carboxyl group to obtain PAS having a high carboxyl group content is also one of the preferred aspect. Preferable examples of the monohalogenated compound having a carboxyl group include a monohalogenated aromatic compound having a carboxyl group. Specific examples of the monohalogenated compound include 2-chlorobenzoic acid, 3-chlorobenzoic acid, 4-chlorobenzoic acid, sodium hydrogen 4-chlorophthalate, 2-amino-4-chlorobenzoic acid, 4-chloro-3-nitrobenzoic acid, and 4'-chlorobenzophenone-2-carboxylic acid. From the viewpoint of reactivity during polymerization and general versatility, preferable monohalogenated compound includes 3-chlorobenzoic acid, 4-chlorobenzoic acid, and sodium hydrogen 4-chlorophthalate. As long as the desired effects are not impaired, it is also possible to use the monohalogenated compounds such as chlorobenzene, 1-chloronaphthalene, 2-chloroaniline, 3-chloroaniline, 4-chloroaniline, 2-chlorophenol, 3-chlorophenol, 4-chlorophenol, 4-chlorobenzamide, 4-chlorobenzeneacetamide, 4-chlorobenzenesulfonamide, 4-chlorobenzenesulfonic acid, 4-chlorobenzenethiol, 2-amino-5-chlorobenzophenone, 2-amino-4-chlorophenol, 2-chloronitrobenzene, 3-chloronitrobenzene, 4-chloronitrobenzene, and 4-chlorophthalic anhydride, and a mixture thereof.

When the monohalogenated compound is used, the amount thereof is 0.01 mol or more and less than 20 mol, more preferably 0.1 mol or more and less than 15 mol, still more preferably 1.0 mol or more and less than 10 mol, and particularly preferably 2.0 mol or more and less than 8 mol, based on 100 mol of the sulfidizing agent. If the amount of the monohalogenated compound is less than 0.01 mol based on 100 mol of the sulfidizing agent, the amount of the carboxyl group of PAS thus obtained decreases. If the amount of the monohalogenated compound is 20 mol or more based on 100 mol of the sulfidizing agent, the molecular weight of PAS thus obtained may decrease, leading to deterioration of mechanical properties or chemical resistance.

The total amount of halogenated compounds such as a dihalogenated aromatic compound and a monohalogenated compound is preferably set within a specific range. The total amount of the halogenated compound is preferably 98 mol or more and less than 110 mol, more preferably 100 mol or more and less than 108 mol, and still more preferably 103 mol or more and less than 107 mol, based on 100 mol of the sulfidizing agent. If the total amount of the halogenated compound is less than 98 mol based on 100 mol of the sulfidizing agent, PAS thus obtained may be decomposed. If the total amount of the halogenated compound is 110 mol or more based on 100 mol of the sulfidizing agent, the molecular weight of PAS thus obtained may decrease, leading to deterioration of mechanical properties or chemical resistance. The halogenated compounds includes not only a dihalogenated aromatic compound and a monohalogenated aromatic compounds having a reactive functional group mentioned above, but also a polyhalogenated (trihalogenated or higher polyhalogenated) compound used for a branching agent and a cross-linking agent mentioned below.

There is no particular limitation on timing of the addition of the monohalogenated compound, and they may be added at any time point of during the dehydration step, at the initiation of the polymerization, or in the middle of the polymerization as mentioned below, or may be added plural times. In an addition during the dehydration step, there is a need to use a reflux device which does not cause vaporization of the monohalogenated compound during the dehydration step. In an addition in the middle of polymerization (under an increased pressure), an injection device is required, and since the monohalogenated compound reacts in the middle of polymerization, the monohalogenated compound is not completely consumed at the completion of the polymerization and remains in the polymerization system. When the monohalogenated aromatic compound having a carboxyl group is used as the monohalogenated compound, the amount of introduction of carboxyl groups into PAS decreases, and thus excellent mechanical properties and chemical resistance are unlikely to be exhibited. Therefore, the monohalogenated compound having a carboxyl group is preferably added at the timing when a conversion ratio of the monohalogenated compound is less than 80%, more preferably less than 70%, and still more preferably added at the timing between after the completion of the dehydration step and the initiation of the polymerization, and most preferably at the initiation of the polymerization, namely addition simultaneously with the monohalogenated compound.

The monohalogenated compound can be used to adjust the molecular weight of PAS or to decrease a chlorine content of PAS. Use of the monohalogenated compound having a carboxyl group contributes not only to an increase in a carboxyl group content of PAS but also to a decrease in a chlorine content.

(A-5) Polymerization Auxiliary

In the production of PAS, use of the polymerization auxiliary is also preferred. Use of the polymerization auxiliary adjusts the melt viscosity of PAS thus obtained to desired value. Examples of the polymerization auxiliary include an organic carboxylic acid metal salt, water, an alkali metal chloride (except for sodium chloride), an organic sulfonic acid metal salt, a sulfuric acid alkali metal salt, an alkaline earth metal oxide, an alkali metal phosphate, and an alkaline earth metal phosphate. They may be used alone, or two or more thereof may be used simultaneously. Of these, an organic carboxylic acid metal salt and/or water are/is preferably used.

The organic carboxylic acid metal salt can also be used in the form of a hydrate, an anhydride, or a solution. Examples thereof include lithium acetate, sodium acetate, potassium acetate, magnesium acetate, calcium acetate, sodium propionate, lithium valerate, sodium benzoate, sodium phenylacetate, and a mixture thereof. Sodium acetate, which is inexpensive and has a suitable solubility in a reaction system, is preferably used.

The amount of the above organic carboxylic acid metal salt to be used as a polymerization auxiliary is preferably 1 mol or more and less than 70 mol, more preferably 2 mol or more and less than 60 mol, and still more preferably 2 mol or more and less than 55 mol, based on 100 mol of the sulfidizing agent charged.

When the organic carboxylic acid metal salt is used as a polymerization auxiliary, there is no particular limitation on the timing of addition thereof, and it may be added at any time point of during the dehydration step, at the initiation of the polymerization, or in the middle of the polymerization mentioned below, or may be added plural times. From the viewpoint of ease of addition, addition simultaneously with a sulfidizing agent at the initiation of the dehydration step or at the initiation of the polymerization is preferable.

When water is used as a polymerization auxiliary, water can be used alone, but simultaneous use of an organic carboxylic acid metal salt is preferable. Whereby, the effects of a polymerization auxiliary can be increased, and even smaller usage of a polymerization auxiliary may be able to obtain PAS having a desired melt viscosity in a short time. In this case, the amount of moisture in the polymerization system is 80 mol or more and less than 300 mol, and more preferably 85 mol or more and less than 180 mol, based on 100 mol of the sulfidizing agent. If the amount of moisture is too high, an increase in the pressure in a reactor is large and a reactor having a high pressure resistance performance is required, which may not be preferable from the viewpoint of both economy and safety.

Addition of water after polymerization is also preferred. The amount of moisture in the polymerization system after water is added after polymerization is 100 to 1,500 mol, and more preferably 150 to 1,000 mol, based on 100 mol of the sulfidizing agent.

(A-6) Molecular Weight Modifier

In the production of PAS, to form a branched or cross-linked polymer and adjust the melt viscosity of PAS thus obtained to desired one, a branching agent and a cross-linking agent such as a polyhalogenated (trihalogenated or higher polyhalogenated) compound, can be used simultaneously. The polyhalogenated aromatic compound is preferable as the polyhalogenated compound, and examples thereof include 1,3,5-trichlorobenzene and 1,2,4-trichlorobenzene.

(A-7) Polymerization Stabilizer

In the production of PAS, to stabilize the polymerization reaction system and prevent a side reaction from occurring, a polymerization stabilizer can be used. The polymerization stabilizer contributes to stabilization of the polymerization reaction system and inhibits an undesirable side reaction such as production of thiophenol. Examples of the polymerization stabilizer include compounds such as alkali metal hydroxide, alkali metal carbonate, alkaline earth metal hydroxide, and alkaline earth metal carbonate. Of these, alkali metal hydroxides such as sodium hydroxide, potassium hydroxide, and lithium hydroxide are preferable. The organic carboxylic acid metal salt mentioned above also serves as a polymerization stabilizer. While a mention was made of the fact that simultaneous use of alkali metal hydroxide is particularly preferable when alkali metal hydrosulfide is used as the sulfidizing agent, here alkali metal hydroxide, which becomes excessive for the sulfidizing agent, can also be a polymerization stabilizer.

These polymerization stabilizers may be used alone, or two or more thereof may be used simultaneously. It is desirable to use polymerization stabilizers in the proportion of preferably 1 to 20 mol, and more preferably 3 to 10 mol, based on 100 mol of the sulfidizing agent in the reaction system before the initiation of the polymerization reaction. If this proportion is too high, economic disadvantage may occur or polymer yield may decrease. If some of alkali metal sulfide is degraded during reaction and hydrogen sulfide occurs, alkali metal hydroxide thus produced can also be a polymerization stabilizer.

There is no particular limitation on the timing of addition of polymerization stabilizers, and they may be added at any time point of during the dehydration step, at the initiation of the polymerization, or in the middle of the polymerization mentioned below, or may be added plural times.

(A-8) Dehydration Step

In the production of PAS, a sulfidizing agent is usually used in the form of a hydrate. Before the dihalogenated aromatic compound or the monohalogenated compound is added, it is preferable to raise the temperature of a mixture containing an organic polar solvent and a sulfidizing agent to remove an excessive amount of water out of the system. This step is referred to as a dehydration step. There is no particular limitation on this method, and examples thereof include a method of adding alkali metal hydrosulfide and alkali metal hydroxide to an organic polar solvent, desirably under an inert gas atmosphere within a temperature range of normal temperature to 150° C., preferably normal temperature to 100° C., and then raising the temperature to at least 150° C. or higher, preferably 180° C. to 260° C., under a normal pressure or reduced pressure to evaporate moisture. A polymerization auxiliary may be added at this stage.

The amount of moisture in the system at the completion of the dehydration step is preferably 90 to 110 mol, based on 100 mol of the sulfidizing agent charged. The amount of moisture in the system is an amount obtained by subtracting the amount of moisture removed out of the system from the amount of moisture charged in in the dehydration step.

(A-9) Polymerization Step

In the production of PAS, a polymerization step in which the reactants prepared in the above dehydration step are brought into contact with dihalogenated aromatic compounds or the monohalogenated compound in an organic polar solvent to perform polymerization reaction is performed. At the initiation of the polymerization step, dihalogenated aromatic compounds or the monohalogenated compound are added, desirably under an inert gas atmosphere with a temperature of 100 to 220° C., preferably 130 to 200° C. A polymerization auxiliary may be added at this stage. The order of the charge-in of these raw materials may be random or simultaneous.

The polymerization step is preferably performed at 200° C. or higher and lower than 280° C., but there is no limitation on the polymerization conditions as long as the desired effects are obtained. For example, a method of raising the temperature at a constant rate, and then continuing the reaction at a temperature of 245° C. or higher and lower than 280° C. for a certain period of time, a method of performing a reaction at a constant temperature at a temperature of 200° C. or higher and lower than 245° C. for a certain period of time, and then raising the temperature to a temperature of 245° C. or higher and lower than 280° C. to continue the reaction for a certain period of time, and a method of performing a reaction at a constant temperature at a temperature of 200° C. or higher and lower than 245° C., particularly 230° C. or higher and lower than 245° C., for a certain period of time, and then raising the temperature to a temperature of 245° C. or higher and lower than 280° C. to complete the reaction in a short time are included. Particularly, preferable polymerization conditions for obtaining PAS having a large amount of a carboxyl group necessary for obtaining a PAS resin composition and a small amount of a volatile component include polymerization conditions that, when PAS is obtained by reaction of a sulfidizing agent with a predetermined amount of dihalogenated aromatic compounds or the monohalogenated compound at a temperature of 200° C. or higher and lower than 280° C. in an organic polar solvent, undergo the following steps:

Step 1 A step in which at a temperature of 230° C. or higher and lower than 245° C., polymerization time (T1a) including temperature rise/decrease time is 30 minutes or more and less than 3.5 hours, and a prepolymer of PAS is produced by reaction so that a conversion ratio of dihalogenated aromatic compounds at the completion of the step is 70 to 98 mol %; and Step 2 A step in which at a temperature of 245° C. or higher and lower than 280° C., polymerization time (T2) including temperature rise/decrease time is 5 minutes or more and less than 1 hour, and PAS is obtained by reaction of the prepolymer of PAS.

The step 1 and the step 2 will be described in detail below.

Step 1 To obtain PAS having a large amount of a carboxyl group and a small amount of a volatile component, it is preferable to perform step 2 after a conversion ratio of dihalogenated aromatic compounds or the monohalogenated compound is sufficiently increased at a low temperature. However, since the reaction rate is slow in a reaction at a polymerization temperature of less than 230° C., a conversion ratio of dihalogenated aromatic compounds or the monohalogenated compound may be difficult to increase, PAS thus obtained may exhibit low melt viscosity, thus making it difficult to obtain melt fluidity suited for injection molding. To increase a conversion ratio of dihalogenated aromatic compounds by reaction only at a temperature of less than 230° C., a long term reaction is required, which is not preferable from the viewpoint of production efficiency. Therefore, in Step 1, it is good to perform a reaction at a temperature of 230° C. or higher and lower than 245° C., at which the reaction rate is relatively higher, for 30 minutes or more and less than 3.5 hours, preferably 40 minutes or more and less than 3.5 hours, more preferably 1 hour or more and less than 3 hours, and still more preferably 1.5 hours or more and less than 3 hours. Since a conversion ratio of dihalogenated aromatic compounds is increased at a temperature of 230° C. or higher and lower than 245° C., to shorten the polymerization time at a temperature of less than 230° C. is preferable from the viewpoint of production efficiency. Polymerization time at a temperature of 200° C. or higher and lower than 230° C. is preferably 2 hours or less, and more preferably 1 hour or less. Furthermore, polymerization time (T1) including temperature rise/decrease time at a temperature of 200° C. or higher and lower than 245° C. including Step 1 is preferably 1.5 hours or more and less than 4 hours, more preferably 1.5 hours or more and less than 3.5 hours, and still more preferably 2 hours or more and 3.5 hours or less. If T1 is less than 1.5 hours, a conversion ratio of dihalogenated aromatic compounds mentioned below may decrease, and an unreacted sulfidizing agent in the step 2 may cause decomposition of a prepolymer, leading to an increase in the amount of a volatile component when PAS thus obtained is subjected to melting with heating. If T1 is more than 4 hours, production efficiency decreases.

An average temperature rise rate within the polymerization temperature range is desirably 0.1° C./minute or more. The average temperature rise rate is an average rate that, based on time m (minute) that is required to raise the temperature within a temperature interval from a certain constant temperature t2 (° C.) to a certain constant temperature t1 (° C.) (t2<t1), is calculated by the following formula:

Average temperature rise rate (° C./minute)=[t1 (° C.)−t2 (° C.)]/m (minute).

Therefore, as long as a rate is within the average temperature rise rate as mentioned above, the rate is not necessarily a constant rate, and there may be a constant temperature interval, temperature may be increased by multi-stage, or there may be an interval in which the temperature rise rate is temporarily negative.

The average temperature rise rate is more preferably 2.0° C./minute or less, and still more preferably 1.5° C./minute or less. If the average temperature rise rate is too high, it may be difficult to control a reaction, and larger energy may be required since the temperature is increased. If a violent reaction occurs at the early stage of reaction, it may be preferable to perform a reaction by performing a reaction at 240° C. or lower to some degree and then raising the temperature to a temperature of higher than 240° C.

It is preferable to produce a prepolymer of PAS by reaction so that a conversion ratio of dihalogenated aromatic compounds at the completion of step 1 is 70 to 98 mol %, and it is desirable to perform a reaction so that the conversion ratio is more preferably 75 mol % or more, still more preferably 80 mol % or more, and yet more preferably 90 mol % or more. If the step is transferred to step 2 with the conversion ratio being low, an unreacted sulfidizing agent may cause decomposition of a prepolymer, leading to an increase in the amount of a volatile component when PAS thus obtained is subjected to melting with heating. If a reaction is performed until the conversion ratio in step 1 is more than 98 mol %, production efficiency decreases since a long polymerization time is required. The conversion of a dihalogenated aromatic compound (hereinafter abbreviated to DHA) is a value calculated by the following formula. The residual amount of DHA can be usually calculated by gas chromatography.

(a) When a dihalogenated aromatic compound is excessively added for a sulfidizing agent in molar ratio Conversion ratio={[charge amount of DHA (mol)−remaining amount of DHA (mol)]/[charge amount of DHA (mol)−remaining amount of DHA (mol)]}×100%

(b) In the case other than the above (a)

Conversion ratio={[charge amount of DHA (mol)−remaining amount of DHA (mol)]/[charge amount of DHA (mol)]}×100%.

Step 2 The final temperature in step 2 is preferably 275° C. or lower, and more preferably 270° C. or lower. If polymerization ended only in step 1 without undergoing step 2, or if the polymerization time in step 2 is extremely short, the melt viscosity of PAS thus obtained may decrease, leading to a decrease in the strength of a molded article. If the rate of reaction of compounds having a carboxyl group is low, the amount of a carboxyl group of PAS is small and, if the monohalogenated compound is used, the effects on reduction of a chlorine content are also small. If the flash method is used in a polymer recovery step mentioned below, since flash energy is small when the temperature of a polymer is low, a problem that the vaporization heat of a polymerization solvent decreases and flash recovery cannot be performed efficiently also occurs. If the final temperature in the step 2 reaches 280° C. or higher, PAS thus obtained may exhibit too high melt viscosity, pressure in the reactor may significantly increase, and a reactor having a high pressure resistance performance may be required, which is not preferable from the viewpoint of both economy and safety. If the polymerization temperature is higher, the mechanical properties of PAS may decrease due to pyrolysis or modification of a carboxyl group introduced into PAS.

The polymerization time (T2) in step 2 is preferably 5 minutes or more and less than 1 hour, more preferably 10 minutes or more and less than 40 minutes, and still more preferably 10 minutes or more and less than 30 minutes. When a sulfidizing agent is reacted with dihalogenated aromatic compounds or the monohalogenated compound in the presence of alkali metal hydroxide in an organic polar solvent, a side reaction in which an organic polar solvent, such as NMP, is reacted with alkali metal hydroxide to produce alkali metal alkylamino alkylcarboxylate proceeds. If the polymerization time (T2) in step 2 is 1 hour or more, the side reaction may proceed markedly, and the amount of a volatile component derived from a by-reactant may increase when PAS thus obtained is subjected to melting with heating. If the polymerization time is long, a problem of decreased production efficiency or increased melt viscosity of PAS also occurs, and the mechanical properties of PAS may decrease due to pyrolysis or modification of a carboxyl group introduced into PAS. In addition, decomposition of the main chain of PAS due to heat, accompanied by deterioration of mechanical properties, also occurs.

The reaction in step 2 may be any of a single-stage reaction with a constant temperature, a multi-stage reaction with increasing temperature step by step, or a reaction with changing temperature continuously.

A ratio (T1a/T2) of the polymerization time in step 1 (T1a) to the polymerization time in step 2 (T2) is preferably 0.5 or more. If the ratio is higher, a conversion ratio of dihalogenated aromatic compounds or the monohalogenated compound can be increased while securing sufficient polymerization time in step 1, and the polymerization time in step 2 can be shortened. By shortening the time of a reaction at a high temperature such as that in step 2, pyrolysis or modification of a carboxyl group introduced into PAS can also be inhibited, and thus high mechanical properties or chemical resistance can be exhibited. Therefore, T1a/T2 is more preferably 1 or more, still more preferably two or more, and yet more preferably 5 or more. There is no particular limitation on the upper limit of T1a/T2, and, for obtaining PAS having preferable melt fluidity, the upper limit is preferably 25 or less, and more preferably 20 or less.

A ratio (T1/T2) of the polymerization time at a temperature of 200° C. or higher and lower than 245° C. including step 1 (T1) to the polymerization time in step 2 (T2) is preferably 1.2 or more. If the ratio is higher, a conversion ratio of dihalogenated aromatic compounds or the monohalogenated compound can be increased while securing sufficient polymerization time at a low temperature, and the polymerization time in step 2 can be shortened. Therefore, T1/T2 is more preferably 3 or more, and still more preferably 5 or more. There is no particular limitation on the upper limit of T1/T2, and, for obtaining PAS having preferable melt fluidity, the upper limit is preferably 30 or less, and more preferably 25 or less.

Furthermore, the total reaction time (T1+T2) from the initiation of step 1 to the completion of step 2 is preferably less than 5 hours, more preferably less than 4 hours, and still more preferably less than 3.5 hours. A longer polymerization time leads to decreased production efficiency, and may cause an increase in the amount of a volatile component or deterioration of melt fluidity during melting, or deterioration of mechanical properties of PAS due to pyrolysis or modification of a carboxyl group.

Atmosphere of the polymerization is desirably a non-oxidizing atmosphere, and the polymerization is performed preferably under an inert gas atmosphere, such as nitrogen, helium, and argon. Particularly, nitrogen is preferable from the viewpoint of economy and ease of handling. There is no particular limitation on reaction pressure since it depends on the type, amount, or reaction temperature of raw materials and solvents used, and cannot be specified unconditionally.

The amount of the carboxyl group introduced into PAS at the completion of the polymerization reaction step can be evaluated by comparing the absorption derived from a benzene ring with the absorption derived from the carboxyl group by FT-IR.

When the halogenated aromatic compound having a carboxyl group is added to the polymerization step for introducing a carboxyl group into PAS, the chemical formula of the compound is represented by:

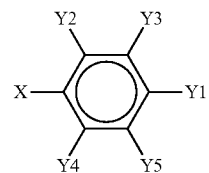

wherein X is a halogen group. Y1 is a halogen group or a carboxyl group. Y2 to Y5 each represents hydrogen, an alkyl group, an alkoxy group, a phenylene group, an amino group, an amide group, an ester group, an imide group, an acetamide group, a sulfonamide group, a sulfonic acid group, a carboxyl group, a hydroxyl group, a thiol group, a cyano group, an isocyanate group, an aldehyde group, an acetyl group, an anhydride group, an epoxy group, a silanol group, an alkoxysilane group, or a substituent selected from a derivative thereof, and when Y1 is a halogen group, at least one of Y2 to Y5 is a carboxyl group. In other words, it is a dihalogenated aromatic compound having a carboxyl group or a monohalogenated aromatic compound having a carboxyl group, and two or more compounds may be mixed to be used for reaction. The reaction amount is preferably 0.1 mol or more and less than 20 mol, more preferably 1.0 mol or more and less than 6 mol, and still more preferably 1.5 mol or more and less than 5 mol, based on 100 mol of the sulfidizing agent. The reaction amount is a value obtained by subtracting the residual amount from the charge amount after halogenated aromatic compounds having a carboxyl group remaining in samples that are taken after completion of the polymerization step are determined by gas chromatography. A higher reaction amount means a higher amount of a carboxyl group introduced into PAS, and means that higher mechanical properties and chemical resistance are exhibited. If the reaction amount is 20 mol or more based on 100 mol of the sulfidizing agent, the molecular weight of PAS thus obtained decreases, leading to deterioration of mechanical properties. Meanwhile, if the reaction amount is less than 0.1 mol, mechanical properties deteriorate because of a small amount of the carboxyl group of PAS thus obtained.

(A-10) Polymer Recovery

In the production of PAS, after completion of the polymerization step, PAS is recovered from polymerization reactants containing PAS components obtained in the polymerization step and solvents. Recovery methods include, for example, the flash method, namely a method of flashing polymerization reactants from a state of high temperature and pressure (usually 250° C. or higher, 0.8 MPa or more) to an atmosphere under a normal pressure or reduced pressure, and for powdering and granulating the polymer concurrently with recovery of the solvents to recover the polymer, or the quench method, namely a method of gradually cooling polymerization reactants from a state of high temperature and pressure to precipitate PAS components in the reaction system, and filtering the components in a state of 70° C. or higher, preferably 100° C. or higher, to recover solids containing PAS components.

The recovery method is not limited to either of the quench method or the flash method. Since the flash method is an economically excellent recovery method from the viewpoint of the fact that recovery of solids simultaneously with recovery of solvents is possible, recovery time is relatively short, the amount of recovered materials is larger compared to the quench method and, since PAS having higher melt fluidity than PAS obtained by the quench method is likely to be easily obtained because PAS thus obtained by the flash method contains a large amount of oligomer component represented by chloroform-extracted components, the flash method is a preferable recovery method.

By the flash method, solvents can be efficiently recovered by utilizing the vaporization heat of the solvents when polymerization reactants in a state of high temperature and pressure are flashed in an atmosphere under a normal pressure. If the temperature of polymerization reactants during flashing is low, the efficiency of recovery of solvents decreases and productivity worsens. Therefore, the temperature of polymerization reactants during flashing is preferably 250° C. or higher, and more preferably 255° C. or higher. The atmosphere during flashing is preferably nitrogen or steam or the like. The temperature of an atmosphere is preferably 150 to 250° C., and if recovery of solvents from polymerization reactants is insufficient, heating may be continued under an atmosphere of nitrogen or steam at 150 to 250° C. after flashing.

Since PAS obtained by the flash method contains ionic impurities such as an alkali metal halogenated compound and an alkali metal organic compound, which are polymerization by-products, washing is preferably performed. There is no particular limitation on washing conditions as long as they are sufficient to remove the ionic impurities. Washing solutions include, for example, a method of washing using water or organic solvents. Since it is simple and inexpensive and high melt fluidity can be obtained by containing oligomer components in PAS, washing using water is exemplified as a preferable method. It is preferable to perform a process in which PAS is immersed in any of liquid of water, an acid, or a solution of an acid, or a solution of an alkali metal salt or an alkali earth metal salt once or more, and it is more preferable to perform a filtration step in which a polymer is separated from a washing solution between each washing process.

When PAS is immersed in an acid or a solution of an acid, the pH of the washing solution after processing is preferably 2 to 8. An acid or a solution of an acid is an organic acid, an inorganic acid, or water that is made acidic by addition of an organic acid, an inorganic acid or the like. Examples of the organic acid or inorganic acid to be used include acetic acid, propionic acid, hydrochloric acid, sulfuric acid, phosphoric acid, formic acid and the like. Acetic acid or hydrochloric acid is preferable.

When PAS is immersed in a solution of an alkali metal salt or an alkali earth metal salt, the amount of the alkali metal salt or the alkali earth metal salt in the solution is preferably 0.01 to 5 mass %, and more preferably 0.1 to 0.7 mass %. A solution of an alkali metal salt or an alkali earth metal salt is prepared by dissolving an alkali metal salt, an alkali earth metal salt or the like in water. Examples of the alkali metal salt or the alkali earth metal salt to be used include, but are not limited to, a calcium salt, a potassium salt, a sodium salt, a magnesium salt or the like of the above organic acid.

The temperature when PAS is washed with a washing solution is preferably 80° C. or higher and 220° C. or lower and, from the viewpoint of obtaining PAS having less ionic impurities, the temperature is more preferably 150° C. or higher and 200° C. or lower, and still more preferably 180° C. or higher and 200° C. or lower.

Water used for the washing solution is preferably distilled water or deionized water. For the proportion of PAS and a washing solution, the amount of PAS is 10 to 500 g of PAS based on 1 liter of the washing solution.

Any of the washing solution may be used, and a treatment with an acid is exemplified as an excellent method since higher melt fluidity is obtained.

The washing solution may be used at any stage of the washing step. To efficiently perform washing with a small amount of the washing solution, it is preferred to employ a method in which a treatment of immersing solids recovered by the flash method in hot water at 80° C. or higher and 220° C. or lower and filtering them is performed several times, and then immersing PAS in an acid or a solution of an acid at 150° C. or higher.

PAS thus obtained is dried under a normal pressure and/or reduced pressure. The drying temperature is preferably 120 to 280° C. A drying atmosphere may be any of an inert atmosphere such as nitrogen or helium or under a reduced pressure, an oxidizing atmosphere such as oxygen or air, a mixed atmosphere of air with nitrogen, and an inert atmosphere is preferable from the viewpoint of melt viscosity. The drying time is preferably 0.5 to 50 hours.

To remove a volatile component or to adjust a preferable melt viscosity by cross-linking polymerization, PAS thus obtained can also be treated under an atmosphere containing oxygen at a temperature of 130 to 260° C. for 0.1 to 20 hours.

(A-11) Produced PAS

There is a need for PAS thus obtained to have a carboxyl group content of more than 100 µmol/g and less than 400 µmol/g. The carboxyl group content is preferably 130 µmol/g or more, more preferably 150 µmol/g or more, and still more 160 µmol/g or more. A carboxyl group content is preferably less than 350 µmol/g, more preferably less than 300 µmol/g, and still more preferably less than 250 µmol/g. We found that PAS having a carboxyl group content within such range and a PAS resin composition obtained by mixing a filler have non-conventional excellent mechanical properties and chemical resistance. If the carboxyl group content of PAS is 100 µmol/g or less, the interaction with a filler decreases, leading to reduced effects on improvement in mechanical properties and chemical resistance of a molded article made from a resin composition thus obtained. Meanwhile, if the carboxyl group content of PAS is 400 µmol/g or more, the amount of a volatile component may increase, and thus a void is likely to be formed in the molded article. When a carboxyl group is introduced into the terminal of PAS using the monohalogenated compound having a carboxyl group, there is a need to introduce a large amount of a carboxyl group into the terminal to obtain PAS having a carboxyl content of 400 µmol/g or more. In other words, since the number of the terminals increases, the molecular weight of PAS decreases, and thus making it difficult to obtain PAS having a weight average molecular weight of 10,000 or more and less than 100,000 that is necessary.

There is a need that the weight average molecular weight of PAS is 10,000 or more and less than 100,000. Use of PAS having a larger amount of a carboxyl group than usual PAS leads to significant improvement in mechanical properties and chemical resistance of the molded article thus obtained. Meanwhile, if the molecular weight of PAS is small, the mechanical properties of PAS itself are significantly decreased, which may lead to deterioration of the mechanical properties and chemical resistance of the molded article made from a resin composition obtained by adding a filler even in a large carboxyl group content. If the molecular weight of PAS is too high, the viscosity during melting may significantly increase and a resin composition is not embedded in a mold during injection molding, thus failing to obtain a molded article. The weight average molecular weight of PAS is preferably 15,000 or more, more preferably 16,000 or more, and still more preferably 17,000 or more. The weight average molecular weight of PAS is preferably less than 80,000, more preferably less than 60,000, and still more preferably less than 40,000.

As properties of PAS, the amount of a volatile component volatilizing when melting with heating under vacuum at 320° C. for 2 hours is preferably 1.0 mass % or less. If the amount of the volatile component contained in PAS is large, when a PAS resin composition obtained by adding a filler is molded into various products by injection molding, contamination in a mold or clogging of a mold vent occurs, leading to deterioration of production efficiency. Also, the volatile component causes void formation as a gas in the molded article, leading to a factor for inhibition of exhibition of excellent mechanical properties and chemical resistance. Therefore, the amount of the volatile component is desirably small, more preferably 0.9 mass % or less, and still more preferably 0.8 mass % or less. There is no limitation on the amount of the volatile component since it is preferably small, but usually 0.01 mass % or more thereof occurs.

The amount of the volatile component mentioned above means the amount of an adhesive component obtained from a process in which a component volatilizing when PAS is melted with heating under vacuum is cooled to be liquefied or solidified, and is measured by heating a glass ampule containing PAS vacuum-encapsulated therein under the above conditions using a tubular furnace.

In obtaining PAS, if the monohalogenated compound having a carboxyl group is added during polymerization, the terminal chlorine of PAS is partially substituted with a carboxyl group, and thus the chlorine content of PAS may decrease. In applications of electric and electronic components, there has been increased move to low halogenation as an effort to an environment, and PAS having a low chlorine content has also effects as a materials for reducing environmental burden. The chlorine content of PAS obtained by polymerization reaction using the monohalogenated compound having a carboxyl group is preferably 3,500 ppm or less, more preferably 3,000 ppm or less, and still more preferably 2,500 ppm or less.

As PAS used for a PAS resin composition, two or more PAS(s) can be used in combination. If two or more PAS(s) are used in combination, there is a need that the average carboxyl group content and the weight average molecular weight of all of PAS(s) contained in the PAS resin composition are required are within a specific range.

(B) Filler

For a polyarylene sulfide resin composition, there is a need to mix the above PAS with a filler. The addition of a filler to a specific PAS leads to significant improvement in mechanical properties and chemical resistance. Examples of the filler include an inorganic filler and an organic filler.

Examples of the inorganic filler include fibrous inorganic fillers such as glass fiber, glass milled fiber, carbon fiber, potassium titanate whisker, zinc oxide whisker, calcium carbonate whisker, wollastonite whisker, aluminum borate whisker, alumina fiber, silicon carbide fiber, ceramic fiber, plaster fiber, metal fiber, and basalt fiber; and non-fibrous inorganic fillers such as talc, wollastonite, zeolite, sericite, mica, kaolin, clay, isinglass, ferrite, pyrophyllite, bentonite, alumina silicate, silicon oxide, magnesium oxide, alumina, zirconium oxide, titanium oxide, iron oxide, magnesium oxide, calcium carbonate, magnesium carbonate, dolomite, calcium sulfate, barium sulfate, calcium hydroxide, magnesium hydroxide, aluminum hydroxide, glass bead, glass flake, glass powder, ceramic bead, boron nitride, silicon nitride, silicon carbide, aluminum silicate, calcium silicate, silica, graphite, carbon black, and graphite.

Examples of the organic filler include fibrous organic fillers such as polyethylene fiber, polypropylene fiber, polyester fiber, polyamide fiber, polyaramid fiber, fluororesin fiber, thermosetting resin fiber, epoxy resin fiber, polyvinylidene chloride fiber, polyvinylidene fluoride fiber, and cellulose fiber; and non-fibrous organic fillers such as ebonite powder, cork powder, and wood flour.

These inorganic fillers and organic fillers may be hollow. Two or more of these fillers can be used in combination. These fillers may be used after being subjected to a preliminary treatment with coupling agents such as an isocyanate compound, an organosilane compound, an organotitanate compound, an organoborane compound, and an epoxy compound.

There is no limitation on the fibrous form of a fibrous filler, and either of a short fiber or a long fiber can be used. The short fiber generally means a fibrous filler having an average fiber length of 1 mm or more and less than 10 mm before mixing. The long fiber generally means a fibrous filler having an average fiber length of 10 mm or more and less than 50 mm before mixing. Generally, it is prepared by cutting or crushing a stranded fiber. The average fiber length means an average fiber length calculated by the following equation considering the contribution of the fiber length.

$$\text{Average fiber length } (Lw) = \Sigma(Wi \times Li)/\Sigma Wi = /(\pi ri^2 \times Li \times \rho \times ni \times Li)/\Sigma(\pi ri^2 \times Li \times \rho \times ni)$$

If a fiber diameter ri and a density ρ are constant, the above formula is abbreviated to the equation.

$$\text{Average fiber length } (Lw) = /\Sigma(Li^2 \times ni)/\Sigma(Li \times ni)$$

where

Li: fiber length of fibrous filler ni: number of fibrous fillers having fiber length Li
Wi: weight of fibrous filler
ri: fiber diameter of fibrous filler
ρ: density of fibrous filler.

The type of the filler is not specified, but considering the reinforcement effects of the filler as a resin composition, fibrous inorganic fillers such as glass fiber and carbon fiber are preferable. The carbon fiber has not only effects on improvement in mechanical properties, but also effects on weight reduction of a molded article. If the filler is a carbon fiber, more effects on improvement in the mechanical properties and chemical resistance of a PAS resin composition are exhibited, and thus the carbon fiber is more preferable. Of PAN-, pitch-, and rayon-based carbon fibers, a PAN-based carbon fiber is preferable from the viewpoint of a balance between the strength and the elastic modulus of a molded article.

Addition of a sizing agent to a filler is preferable since occurrence of fluff or broken thread can be inhibited, leading to improvement in high-level workability, and also mechanical properties and chemical resistance of a molded article obtained from a PAS resin composition can be improved. In the carbon fiber, addition of a sizing agent increases the effects of improving the mechanical properties. There is no particular limitation on the adhesion amount of the sizing agent, and it is preferably 0.01 to 10 mass %, more preferably 0.05 to 5 mass %, and still more preferably 0.1 to 2 mass % based on a filler. If the adhesion amount of a sizing agent is less than 0.01 mass %, effects on improvement in the mechanical properties of a PAS resin composition are unlikely to appear. If the adhesion amount is more than 10 mass %, the sizing agent may vaporize during melting of a PAS resin composition, leading to deterioration of the operation environment due to occurrence of a gas. Examples of the sizing agent include an epoxy resin, polyethylene glycol, polyurethane, polyester, an emulsifier, or a surfactant, and the epoxy resin is preferable. These sizing agents may be used alone or two or more thereof may be used in combination.

The mixing amount of the filler (B) is preferably 10 to 250 parts by mass, more preferably 20 to 150 parts by mass, and still more preferably 30 to 100 parts by mass based on 100 parts by mass of the PAS resin (A). If the mixing amount of the filler (B) is more than 250 parts by mass, the melt fluidity of a PAS resin composition deteriorates. If the mixing amount is less than 10 parts by mass, small reinforcement effects of the filler are exerted, and thus excellent mechanical properties and effects of improving chemical resistance are unlikely to be exhibited.

(C) Olefin-Based Copolymer

Further mixing of the polyarylene sulfide resin composition with an olefin-based copolymer is also one of the preferred aspects. The olefin-based copolymer is more preferably an olefin-based copolymer having at least one functional group selected from the group consisting of an epoxy group, a carboxyl group, an acid anhydride group, an amino group, a hydroxyl group, and a mercapto group. Of these, an epoxy group-containing olefin-based copolymer is preferably used since compatibility with the PAS resin is satisfactory and high toughness is exhibited. Examples of the epoxy group-containing olefin-based copolymer include an olefin copolymer obtained by copolymerizing an olefin-based monomer component with a monomer component having an epoxy group. It is also possible to use a copolymer in which the double bond moiety of an olefin-based copolymer having a double bond in a main chain is epoxidized.

Examples of the functional group-containing component to introduce a monomer component having an epoxy group into an olefin-based copolymer include monomers having an epoxy group such as glycidyl acrylate, glycidyl methacrylate, glycidyl ethacrylate, glycidyl itaconate, and glycidyl citraconate.

The amount of introduction of the monomer component having an epoxy group is preferably 0.001 mol % or more, and more preferably 0.01 mol % or more, based on the entire monomer serving as a raw material of the epoxy group-containing olefin-based copolymer. The introduction amount is preferably 40 mol % or less, and more preferably 35 mol % or less, based on the entire monomer serving as a raw material of the epoxy group-containing olefin-based copolymer.

The olefin-based copolymer is preferably an epoxy group-containing olefin-based copolymer including an α-olefin and a glycidyl ester of an α,β-unsaturated carboxylic acid as a copolymerization component. The α-olefin is preferably ethylene. It is also possible to further copolymerize such a copolymer with α,β-unsaturated carboxylic acids such as acrylic acid and methacrylic acid, and an olefin-based copolymer copolymerized with salts thereof such as Na, Zn, K, Ca, and Mg, and a monomer component selected from α,β-unsaturated carboxylic acid alkyl esters such as methyl acrylate, ethyl acrylate, butyl acrylate, methyl methacrylate, ethyl methacrylate, and butyl methacrylate, styrene, acrylonitrile, and the like.

It is also possible to use, as the olefin-based copolymer, an olefin-based copolymer obtained by introducing acid anhydrides such as maleic anhydride, succinic anhydride, and fumaric anhydride into an ethylene-α-olefin-based copolymer obtained by copolymerizing ethylene with an α-olefin having 3 to 20 carbon atoms.

Such olefin-based copolymer may be obtained in any of random, alternating, block, and graft copolymerization manners.

Of the olefin-based copolymers obtained by copolymerizing an α-olefin with a glycidyl ester of an α,β-unsaturated carboxylic acid, an olefin-based copolymer obtained by copolymerizing 60 to 99 mass % of an α-olefin with 1 to 40 mass % of a glycidyl ester of an α,β-unsaturated carboxylic acid is particularly preferable.

The above-mentioned glycidyl ester of the α,β-unsaturated carboxylic acid is a compound represented by:

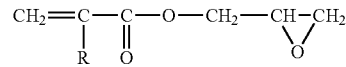

wherein R represents a hydrogen atom, or a linear or branched lower alkyl group having 1 to 6 carbon atoms. Specific examples thereof include glycidyl acrylate, glycidyl methacrylate, and glycidyl ethacrylate. Of these, glycidyl methacrylate is preferably used.

Specific examples of the olefin-based copolymer composed of an α-olefin and a glycidyl ester of an α,β-unsaturated carboxylic acid include an ethylene/propylene-g-glycidyl methacrylate copolymer ("g" represents graft, the same shall apply hereinafter), an ethylene/butene-1-g-glycidyl methacrylate copolymer, an ethylene-glycidyl methacrylate copolymer-g-polystyrene, an ethylene-glycidyl methacrylate copolymer-g-acrylonitrile-styrene copolymer, an ethylene-glycidyl methacrylate copolymer-g-PMMA, an ethylene/glycidyl acrylate copolymer, an ethylene/glycidyl methacrylate copolymer, an ethylene/methyl acrylate/glycidyl methacrylate copolymer, and an ethylene/methyl methacrylate/glycidyl methacrylate copolymer. Of these, an ethylene/glycidyl methacrylate copolymer, an ethylene/methyl acrylate/glycidyl methacrylate copolymer, and an ethylene/methyl methacrylate/glycidyl methacrylate copolymer are preferably used.

Specific examples of the olefin-based copolymer composed of ethylene and an α,β-unsaturated carboxylic acid include ethylene/acrylic acid, ethylene/methacrylic acid (E/MAA), ethylene/acrylic acid/n-butyl acrylate, ethylene/methacrylic acid/n-butyl acrylate, ethylene/methacrylic acid/i so-butyl acrylate, ethylene/acrylic acid/i so-butyl acrylate, ethylene/methacrylic acid/n-butyl methacrylate, ethylene/acrylic acid/methyl methacrylate, ethylene/acrylic acid/ethyl vinyl ether, ethylene/acrylic acid/butyl vinyl ether, ethylene/acrylic acid/methyl acrylate, ethylene/methacrylic acid/ethyl acrylate, ethylene/methacrylic acid/methyl methacrylate, ethylene/acrylic acid/n-butyl methacrylate, ethylene/methacrylic acid/ethyl vinyl ether, and ethylene/acrylic acid/butyl vinyl ether.

The mixing amount of the olefin-based copolymer (C) is preferably 1 to 30 parts by mass, more preferably 3 to 25 parts by mass, and still more preferably 5 to 20 parts by mass, based on 100 parts by mass of the PAS resin (A). If the mixing amount of the olefin-based copolymer (C) is more than 30 parts by mass, the melt fluidity of the PAS resin composition may deteriorate. If the mixing amount is less than 1 part by mass, excellent mechanical properties and effects of improving chemical resistance are unlikely to be exhibited.

It is possible to use, as the olefin-based copolymer, an olefin homopolymer or an olefin-based copolymer, each having no functional group, together with the functional group-containing olefin-based copolymerization, and examples thereof include an ethylene-α-olefin-based copolymer obtained by copolymerizing ethylene with an α-olefin having 3 to 20 carbon atoms. Specific examples of the α-olefin having 3 to 20 carbon atoms include propylene, 1-butene, 1-pentene, 1-hexene, 1-heptene, 1-octene, 1-nonene, 1-decene, 1-undecene, 1-dodecene, 1-tri decene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, and a combination thereof. A copolymer using an α-olefin having 6 to 12 carbon atoms of these α-olefins is more preferable since improvement in mechanical strength and further improvement in modification effect are made. Other examples include polyethylene, polypropylene, polystyrene, polybutene, an ethylene-propylene-diene copolymer, a styrene-butadiene copolymer, a styrene-butadiene-styrene block copolymer (SBS), a styrene-isoprene-styrene block copolymer (SIS), polybutadiene, a butadiene-acrylonitrile copolymer, polyisoprene, a butene-isoprene copolymer, a styrene-ethylene-butylene-styrene block copolymer (SEBS), a styrene-ethylene-propylene-styrene block copolymer (SEPS), and an olefin-based copolymer composed of the above α-olefin and an alkyl ester of the α,β-unsaturated carboxylic acid mentioned above.

(D) Alkoxysilane Compound

In the polyarylene sulfide resin composition, it is preferred to further mix (D) an alkoxysilane compound in the amount of 0.05 to 5 parts by mass based on 100 parts by mass of the PAS resin (A). It is possible to use, as the alkoxysilane compound, an alkoxysilane compound having at least one functional group selected from an epoxy group, an amino group, an isocyanate group, a hydroxyl group, a mercapto group, and an ureido group. Addition of the silane compound leads to improvement in physical properties such as mechanical strength, toughness and low flashing. If the amount of addition of the silane compound is too small, a reduced effect of improving physical properties is exerted. If the amount of addition of the silane compound is too large, the melt viscosity increases, thus making it difficult to perform injection molding. Therefore, the amount is more preferably 0.05 to 3 parts by mass.

Specific examples of such compound include epoxy group-containing alkoxysilane compounds such as γ-glycidoxypropyltrimethoxysilane, γ-glycidoxypropyltriethoxysilane, and β-(3,4-epoxy cyclohexyl)ethyltrimethoxysilane; mercapto group-containing alkoxysilane compounds such as γ-mercaptopropyltrimethoxysilane and γ-mercaptopropyltriethoxysilane; ureido group-containing alkoxysilane compounds such as γ-ureidopropyltriethoxysilane, γ-ureidopropyltrimethoxysilane, and γ-(2-ureidoethyl)aminopropyltrimethoxysilane; isocyanate group-containing alkoxysilane compounds such as γ-isocyanatopropyltriethoxysilane, γ-isocyanatopropyltrimethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane, and γ-isocyanatopropyltrichlorosilane; amino group-containing alkoxysilane compounds such as γ-(2-aminoethyl)aminopropylmethyldimethoxysilane, γ-(2-aminoethyl)aminopropyltrimethoxysilane, and γ-aminopropyltrimethoxysilane; and hydroxyl group-containing alkoxysilane compounds such as γ-hydroxypropyltrimethoxysilane and γ-hydroxypropyltriethoxysilane.

(E) Other Additives

A flame retardant may be mixed to improve the flame resistance of the PAS resin composition. Examples of the flame retardant include hydrated metal-based flame retardants such as aluminum hydroxide and magnesium hydroxide; and inorganic flame retardants such as brominated flame retardants, chlorinated flame retardants, phosphorus based-flame retardants, and antimony trioxide. Of these, phosphorus based-flame retardants are preferable.

There is no limitation on phosphorus based-flame retardants as long as they are compounds having phosphorus atoms, and examples thereof include red phosphorus, organophosphorus compounds, and inorganic phosphates. Examples of the organophosphorus compound include phosphoric acid esters, phosphonic acid, phosphonic acid derivatives, phosphonates, phosphinic acid, phosphinic acid derivatives, phosphinates, phosphine, phosphine oxide, biphosphine, phosphonium salts, phosphazene, phosphaphenanthrene derivatives, and the like.

The content of the flame retardant component is preferably 50 mass % or less, more preferably 30 mass % or less, and still more preferably 20 mass % or less, based on the entire resin composition.

From the viewpoint of improving abrasion resistance of the PAS resin composition, fluororesins such as polytetrafluoroethylene and ethylene-tetrafluoroethylene; and silicone oil may be added. The amount of addition of these additives is preferably 0.1 to 10 mass % based on the entire resin composition.

As long as the desired effects are not impaired, resins other than olefin-based copolymers can be further added to the PAS resin composition. Addition of a small amount of a thermoplastic resin having high flexibility enables further improvement in flexibility and impact resistance. It is not preferable that this amount is more than 30 parts by mass based on 100 parts by mass of the PAS resin, since intrinsic feature is impaired. Therefore, the amount is particularly preferably 25 parts by mass or less. Specific examples of the thermoplastic resin include a polyamide resin, a polybutylene terephthalate resin, polyethylene terephthalate resin, a modified polyphenylene ether resin, a polysulfone resin, a polyallylsulfone resin, a polyketone resin, a polyetherimide resin, a polyallylate resin, a liquid crystal polymer, a polyethersulfone resin, a polyetherketone resin, a polythioetherketone resin, a polyether ether ketone resin, a polyimide resin, a polyamide-imide resin, and a polyethylene tetrafluoride resin.

As long as the desired effects are not impaired, one or more antioxidants selected from phenol-based compounds and phosphorus-based compounds can be included.

Hindered phenol-based compounds are preferably used as a phenol-based antioxidant. Specific examples thereof include triethylene glycol-bis[3-t-butyl-(5-methyl-4-hydroxyphenyl)propionate], N,N'-hexamethylenebis(3,5-di-t-butyl-4-hydroxy-hydrocinnamide), tetrakis[methylene-3-(3',5'-di-t-butyl-4'-hydroxyphenyl)propionate]methane, pentaerythrityltetrakis[3-(3',5'-di-t-butyl-4'-hydroxyphenyl)propionate], 1,3,5-tris(3,5-di-t-butyl-4-hydroxybenzyl)-s-triazine-2,4,6-(1H,3H,5H)-trione, 1,1,3-tris(2-methyl-4-hydroxy-5-t-butylphenyl)butane, 4,4'-butylidenebis(3-methyl-6-t-butylphenol), n-octadecyl-3-(3,5-di-t-butyl-4-hydroxyphenyl)propionate, 3,9-bis[2-(3-(3-t-butyl-4-hydroxy-5-methylphenyl)propionyloxy)-1,1-dimethylethyl]-2,4,8,10-tetraoxaspiro[5,5]undecane, and 1,3,5-trimethyl-2,4,6-tris-(3,5-di-t-butyl-4-hydroxybenzyl)benzene. Of these, ester type hindered phenol compounds are preferable. Specifically, tetrakis[methyene-3-(3',5'-di-t-butyl-4'-hydroxyphenyl)propionate]methane, pentaerythrityltetrakis[3-(3',5'-di-t-butyl-4'-hydroxyphenyl)propionate], and 3,9-bis[2-(3-(3-t-butyl-4-hydroxy-5-methylphenyl)propionyloxy)-1,1-dimethylethyl]-2,4,8,10-tetraoxaspiro[5,5]undecane are preferably used.

Examples of the phosphorus-based antioxidant include bis(2,6-di-t-butyl-4-methylphenyl)pentaerythritol-di-phosphite, bis(2,4-di-t-butylphenyl)pentaerythritol-di-phosphite, bis(2,4-di-cumylphenyl)pentaerythritol-di-phosphite, tris(2,4-di-t-butylphenyl)phosphite, tetrakis(2,4-di-t-butylphenyl)-4,4'-bisphenylenephosphite, di-stearylpentaerythritol-di-phosphite, triphenylphosphite, and 3,5-di-butyl-4-hydroxybenzylphosphonatediethyl ester. Of these, antioxidants having a high melting point are preferable so as to reduce volatilization or decomposition of the antioxidant in the compound of the PAS resin. Specifically, bis(2,6-di-t-butyl-4-methylphenyl)pentaerythritol-di-phosphite, bis(2,4-di-t-butylphenyl)pentaerythritol-di-phosphite, and bis(2,4-di-cumylphenyl)pentaerythritol-di-phosphite are preferably used.

If the amount of addition of such antioxidant is too small, the antioxidant effect is not exerted, whereas, if the amount is too large, the antioxidant is gasified during melt kneading or injection molding, leading to deterioration of operation environment. Therefore, the amount is preferably 0.01 to 10 mass %, and more preferably 0.05 to 3 mass %, based on the entire resin composition.

For the purpose of modification, the following compounds can be added. It is possible to mix plasticizers such as isocyanate-based compounds, organotitanate-based compounds, organoborane-based compounds, polyalkylene oxide oligomer-based compounds, thioether-based compounds, ester-based compounds, and organophosphorus-based compounds; crystal nucleating agents such as talc, kaolin, organophosphorus compounds, and polyether ether ketone; montanic acid waxes, and metal soaps such as lithium stearate and aluminum stearate; mold release agents such as ethylenediamine-stearic acid-sebacic acid polycondensate and silicone-based compounds; coloring inhibitors such as hypophosphite; and additives such as lubricants, ultraviolet inhibitors, coloring agents, and foaming agents. To prevent impairing of intrinsic properties of the PAS resin, the amount of addition of any compound mentioned above is preferably 20 mass % or less, more preferably 10 mass % or less, and still more preferably 1 mass % or less, based on the entire composition.

The PAS resin composition can be obtained by melt kneading of the PAS resin (A) and the filler (B), and if necessary the olefin-based copolymer (C), the alkoxysilane compound (D), and other additives (E). Typical examples of the method of melt kneading include a method in which raw materials are fed in a known melt kneader such as a single- or twin-screw extruder, a Banbury mixer, a kneader, or a mixing roll, and then kneaded at a processing temperature of a melting peak temperature of a PAS resin+5 to 100° C. To enhance dispersibility of various additives during melt kneading, it is preferable that a shear force is comparatively increased. Specifically, use of a twin-screw extruder and use of a screw with two or more kneading sections is preferable, and the screw with three or more kneading sections is more preferable. L/D (L: screw length, D: screw diameter) of the twin-screw extruder is preferably 20 or more, and more preferably 30 or more. In this case, a screw rotation speed is preferably 200 to 500 rpm, and more preferably 250 to 400 rpm.

As mentioned above, the resin temperature during mixing is preferably a melting peak temperature of a PAS resin+5 to 100° C., and more preferably +10 to 70° C. It is not preferable from manufacturing point of view that the kneading temperature is lower than the melting peak temperature of a PAS resin+5° C. since the viscosity of the composition significantly increases due to the existence of a PAS resin, which is not partially melted, leading to increase in burden to the twin-screw extruder. Meanwhile, it is not preferable that the kneading temperature is higher than the melting peak temperature of a PAS resin+100° C. since decomposition or modification of the PAS resin occurs.

There is no particular limitation on the order of mixing raw materials. For example, any of the following methods may be employed: a method of mixing all raw materials and subsequently melt kneading the mixture by the above method; a method of mixing part of the raw materials, melt kneading the partial mixture by the above method, subsequently adding the remaining raw materials and further melt kneading the resulting mixture; and a method of mixing part of the raw materials and subsequently adding the remaining raw materials using a side feeder during melt kneading of the partial mixture with the single-screw extruder or the twin-screw extruder. With respect to small amounts of additive components in the raw materials, an available procedure may melt-knead and pelletize the other components by the above method or another suitable method, subsequently add these additive components prior to molding and then mold the resulting mixture.

The molded article obtained from the PAS resin composition has excellent mechanical properties and chemical resistance. The PAS resin composition can be used not only for applications such as injection molding, injection compression molding, and blow molding, but also for applications where the PAS resin composition is molded into extrusion molded articles such as sheets, films, fibers, and pipes by extrusion molding.

Examples of applications of the PAS resin composition include electric and electronic components such as sensors, LED lamps, connectors, sockets, resistors, relay cases, switches, coil bobbins, capacitors, variable capacitor cases, optical pickups, oscillators, various terminal boards, transformers, plugs, printed circuit boards, tuners, speakers, microphones, headphones, small motors, magnetic head bases, power modules, semiconductors, liquid crystals, FDD carriages, FDD chasses, motor brush holders, parabola antennas, and computer-related components; domestic and office electric appliance components such as VTR components, TV set components, irons, hair dryers, rice cooker components, microwave oven components, acoustic components, compact discs, digital video discs and Blu-ray discs, lighting components, refrigerator components, and air conditioner components; office computer-related components, telephone-related components, facsimile-related components, copy machine-related components, cleaning jigs, motor components, and machine components for lighters and typewriters; optical equipment and precision machine components, such as microscopes, binoculars, cameras and watches; plumbing components such as packings for faucets, combination faucets, pump components, pipe joints, water flow control valves, relief valves, water temperature sensors, water flow sensors and water meter housings; automobile and vehicle-related components such as valve alternator terminals, alternator connectors, IC regulators, potentiometer bases for light dimmers, various valves including emission valves, various pipes for fuel, exhaust system, and air intake system, air intake nozzle snorkels, intake manifolds, fuel pumps, engine coolant joints, carburetor main bodies, carburetor spacers, emission sensors, coolant sensors, oil temperature sensors, throttle position sensors, crankshaft position sensors, air flowmeters, brake pad wear sensors, thermostat bases for air conditioners, hot air flow control valves, brush holders for radiator motors, water pump impellers, turbine vanes, windshield wiper motor-related components, distributors, starter switches, starter relays, transmission wire harnesses, windshield washer fluid nozzles, air conditioner panel switch plates, fuel solenoid valve coils, fuse connectors, horn terminals, electric component insulators, step motor rotors, lamp sockets, lamp reflectors, lamp housings, brake pistons, solenoid bobbins, engine oil filters, fuel tanks, ignition cases, vehicle speed sensors and cable liners; and other various applications.

EXAMPLES

The method will be more specifically described below by way of Examples and Comparative Examples, but this disclosure is not limited only to these Examples. The procedures for the measurement of physical properties are as followings.

Carboxyl Group Content

The carboxyl group content of a PAS resin was calculated using a Fourier transform infrared spectrometer (hereinafter abbreviated to FT-IR).

First, benzoic acid as a reference material was subjected to the measurement by FT-IR. After reading an absorption strength (b1) of a peak at 3,066 cm$^{-1}$ as an absorption of a C—H bond of a benzene ring and an absorption strength (c1) of a peak at 1,704 cm$^{-1}$ as an absorption of a carboxyl group, a carboxyl group content (U1) to a benzene ring 1 unit, (U1)=(c1)/[(b1)/5], was determined. Next, a PAS resin was melt-pressed at 320° C. for 1 minute and quenched to obtain an amorphous film, followed by FT-IR measurement. After reading an absorption strength (b2) at 3,066 cm$^{-1}$ and an absorption strength (c2) at 1,704 cm$^{-1}$, a carboxyl group content (U2) to a benzene ring 1 unit, (U2)=(c2)/[(b2)/4], was determined. When the PAS resin is PPS resin, it is composed of a phenylene sulfide unit, so that the carboxyl group content to 1 g of the PPS resin was calculated from the following equation.

$$\text{Carboxyl group content (µmol/g) of PPS resin} = (U2)/(U1)/108.161 \times 1{,}000{,}000$$

When a meta-phenylene sulfide unit is included in the PPS resin, an absorption is observed at 780 cm$^{-1}$. However, the absorption was not observed in the following PPS-1 to PPS-9.

Weight Average Molecular Weight

The weight average molecular weight (Mw) of a PAS resin was calculated in terms of polystyrene using gel permeation chromatography (GPC). The measurement conditions of GPC are shown below.

Device: SSC-7100 (manufactured by Senshu Scientific Co., Ltd.)
Name of column: Shodex UT-806M
Eluent: 1-chloronaphthalene
Detector: refractive index detector
Column temperature: 210° C.
Pre-thermostatic bath temperature: 250° C.
Pump thermostatic bath temperature: 50° C.
Detector temperature: 210° C.
Flow rate: 1.0 mL/minute
Sample injection volume: 300 µL (in the form of slurry: about 0.2 mass %).

Chlorine Content

Using an automatic sample combustion apparatus AQF-100 manufactured by Dia Instruments Co., Ltd., 1 to 2 mg of a PAS resin was weighed and then combusted at a final temperature of 1,000° C., and then a gas component thus generated was absorbed in 10 mL of water containing a dilute oxidizing agent. The absorption liquid was fed to an ion chromatography system ICS1500 manufactured by Dionex Corporation, using a sodium carbonate-sodium hydrogen carbonate mixed solution as a mobile phase, and then the content of chlorine in the absorption liquid was measured. The total chlorine content of the PAS resin was calculated from the mass of the PAS resin subjected to the measurement and the chlorine content in the absorption liquid.

Amount of Volatile Component

After weighing, 3 g of a PAS resin was charged in a glass ampule (body measuring 100 mm×25 mmφ, neck measuring 255 mm×12 mmφ, thickness of 1 mm) and then the glass ampule was vacuum-encapsulate. Only the body of the glass ampule was inserted into a ceramic electric tubular furnace ARF-30K manufactured by Asahi Rika Seisakusho, followed by heating at 320° C. for 2 hours. A volatile gas volatilized from the PAS resin adhered to the section of the glass ampule, which is not heated by the tubular furnace. After removing the ampule, the neck of the ampule, to which the volatile gas adhered, was cut out by a cutter, followed by weighing. The adhered gas was removed by dissolving with 5 g of chloroform and, after drying in a glass desiccator at 60° C. for 1 hour, the neck of the ampule the neck was weighed again. The amount of a volatile component (mass % to a polymer) was calculated from mass difference before and after removal of the gas of the neck of the ampule.

Melting Point

Using DSC7 manufactured by Perkin-Elmer Corp., about 5 mg of a sample was subjected to the following steps under a nitrogen atmosphere at a temperature rise/temperature fall rate of 20° C./minute:
(1) step of raising the temperature from 50° C. to 340° C., and holding at 340° C. for 1 minute;
(2) step of allowing the temperature to fall to 100° C.;
(3) step of raising the temperature again to 340° C., and holding 340° C. for 1 minute; and
(4) step of allowing the temperature to fall again to 100° C.

The melting peak temperature observed in the step (3) was regarded as a melting point (Tm).

(A) Synthesis of PAS Resin

In the following Synthesis Examples 1 to 9, PPS-1 to PPS-9 were synthesized. Various physical properties of PPS thus synthesized are shown in Table 1.

Synthesis Example 1 (Synthesis of PPS-1)

In a 70 liter autoclave equipped with a stirrer and a bottom plug valve, 8.26 kg (70.00 mol) of 47.5% sodium hydrosulfide, 3.03 kg (72.69 mol) of 96% sodium hydroxide, 11.45 kg (115.50 mol) of N-methyl-2-pyrrolidone (NMP), and 5.50 kg of deionized water were charged, and then a dehydration step was performed by gradually heating the reaction vessel to 225° C. over about 3 hours while passing through nitrogen under a normal pressure. At the point of time when 9.82 kg of water and 0.28 kg of NMP were distilled out, heating was completed and cooling was initiated. At this point of time, the amount of moisture remaining in the system based on 1 mol of the alkali metal hydrosulfide charged was 1.01 mol, including moisture consumed for hydrolysis of NMP. Since the scattering amount of hydrogen sulfide was 1.4 mol, the amount of the sulfidizing agent in the system after the dehydration step was 68.6 mol. As a result of scattering of hydrogen sulfide, 1.4 mol of sodium hydroxide is additionally formed in the system.

After cooling the reaction vessel to 200° C., 10.08 kg (68.60 mol) of p-dichlorobenzene (p-DCB), 0.32 kg (2.06 mol) of p-chlorobenzoic acid, and 9.37 kg (94.50 mol) of NMP were added and reaction vessel was sealed under a nitrogen gas, and then the polymerization step was performed under the following reaction conditions while stirring at 240 rpm.

The temperature was raised from 200° C. to 230° C. at 0.8° C./minute over 38 minutes.

Step 1 Subsequently, the temperature was raised from 230° C. to 245° C. at 0.6° C./minute over 25 minutes. T1 was 63 minutes and T1a was 25 minutes. Upon completion of step 1, the reactant was sampled and a consumption ratio, namely, a conversion ratio of p-DCB was calculated from the results of quantitative determination of the amount of p-DCB remaining in the sample by gas chromatography was calculated. As a result, a conversion ratio of p-DCB was 64%.

Step 2 The temperature was raised from 245° C. to 276° C. at 0.6° C./minute over 52 minutes following step 1, and then the reaction was performed at a given temperature of 276° C. for 65 minutes. T2 was 117 minutes.

Immediately after completion of step 2, the bottom plug valve of the autoclave was opened. The contents were flashed to an apparatus equipped with a stirrer and evaporated until 95% or more of NMP used during polymerization is removed by volatilization in a device equipped with a stirrer at 230° C. for 1.5 hours, and then the solid including PPS and salts was recovered.

The recovered materials thus obtained and 74 liter of deionized water were charged in an autoclave with a stirrer, washed at 75° C. for 15 minutes, and then filtered through a filter to obtain a cake. After performing the operation of washing the cake thus obtained with deionized water at 75° C. for 15 minutes and filtering three times, the cake, 74 liter of deionized water, and 0.4 kg of acetic acid were charged in an autoclave with a stirrer. After replacing the atmosphere in the autoclave by nitrogen, the temperature was raised to 195° C. Thereafter, the autoclave was cooled and the contents were taken out. The contents were filtered through a filter to obtain a cake. The cake thus obtained was dried under nitrogen stream at 120° C. to obtain a dried PPS.

Synthesis Example 2 (Synthesis of PPS-2)

The same operation as in Synthesis Example 1 was performed, except that step 1 and step 2 were performed under the following reaction conditions.

Step 1 The temperature was raised from 230° C. to 238° C. at 0.6° C./minute over 13 minutes. After reacting at a given temperature of 238° C. for 128 minutes, the temperature was raised from 238° C. to 245° C. at 0.8° C./minute over 9 minutes. T1 was 188 minutes, and T1a was 150 minutes. A conversion ratio of p-DCB was 94.5%.

Step 2 The temperature was raised from 245° C. to 255° C. at 0.8° C./minute over 12 minutes following step 1. The polymerization time (T2) of step 2 was 12 minutes.

Synthesis Example 3 (Synthesis of PPS-3)

The same operation as in Synthesis Example 2 was performed, except that 0.39 kg (2.06 mol) of 2,5-dichlorobenzoic acid was added in place of p-chlorobenzoic acid. Upon completion of step 1, a conversion ratio of p-DCB was 94.5%.

Synthesis Example 4 (Synthesis of PPS-4)

The same operation as in Synthesis Example 3 was performed, except that 3.09 kg (74.06 mol) of 96% sodium hydroxide was added to perform a dehydration step, and 9.98 kg (67.91 mol) of p-DCB and 0.66 kg (3.43 mol) of 2,5-dichlorobenzoic acid were added. Upon completion of step 1, a conversion ratio of p-DCB was 94%.

Synthesis Example 5 (Synthesis of PPS-5)

The same operation as in Synthesis Example 1 was performed, except that 2.94 kg (70.63 mol) of 96% sodium hydroxide was added to perform a hydration step, and 10.39 kg (70.66 mol) of p-DCB was added and p-chlorobenzoic acid was not added. Upon completion of step 1, a conversion ratio of p-DCB was 65%.

Synthesis Example 6 (Synthesis of PPS-6)

The same operation as in Synthesis Example 2 was performed, except that 2.94 kg (70.63 mol) of 96% sodium hydroxide was added to perform a hydration step, and 10.39 kg (70.66 mol) of p-DCB was added and p-chlorobenzoic acid was not added. Upon completion of step 1, a conversion ratio of p-DCB was 93%.

Synthesis Example 7 (Synthesis of PPS-7)

The same operation as in Synthesis Example 2 was performed, except that 2.99 kg (71.83 mol) of 96% sodium hydroxide was added to perform a dehydration step, and 10.19 kg (69.29 mol) of p-DCB was added and 0.19 kg (1.20 mol) of p-chlorobenzoic acid was not added. Upon completion of step 1, a conversion ratio of p-DCB was 95%.

Synthesis Example 8 (Synthesis of PPS-8)

The same operation as in Synthesis Example 2 was performed, except that 3.23 kg (77.49 mol) of 96% sodium hydroxide was added to perform a dehydration step, and 9.68 kg (65.86 mol) of p-DCB was added and 1.07 kg (6.86 mol) of p-chlorobenzoic acid was not added. Upon completion of step 1, a conversion ratio of p-DCB was 92.5%.

Synthesis Example 9 (Synthesis of PPS-9)

In a 70 liter autoclave equipped with a stirrer and a bottom plug valve, 8.26 kg (70.00 mol) of 47.5% sodium hydrosulfide, 3.03 kg (72.69 mol) of 96% sodium hydroxide, 11.45 kg (115.50 mol) of N-methyl-2-pyrrolidone (NMP), and 5.50 kg of deionized water were charged, and then a dehydration step was performed by gradually heating the reaction vessel to 225° C. over about 3 hours while passing through nitrogen under a normal pressure. At the point of time when 9.82 kg of water and 0.28 kg of NMP were distilled out, heating was completed and cooling was initiated. At this point of time, the amount of moisture remaining in the system based on 1 mol of the alkali metal hydrosulfide charged was 1.01 mol, including moisture consumed for hydrolysis of NMP. Since the scattering amount of hydrogen sulfide was 1.4 mol, the amount of the sulfidizing agent in the system after the present dehydration step was 68.6 mol. As a result of scattering of hydrogen sulfide, 1.4 mol of sodium hydroxide is additionally formed in the system.

After cooling the reaction vessel to 200° C., 10.08 kg (68.60 mol) of p-dichlorobenzene (p-DCB) and 9.37 kg (94.50 mol) of NMP were added and reaction vessel was sealed under a nitrogen gas, and then the polymerization step was performed under the following reaction conditions while stirring at 240 rpm.

The temperature was raised from 200° C. to 230° C. at 0.8° C./minute over 38 minutes.

Step 1 Subsequently, the temperature was raised from 230° C. to 238° C. at 0.6° C./minute over 13 minutes. After reacting at a given temperature of 238° C. for 128 minutes, the temperature was raised from 238° C. to 245° C. at 0.8° C./minute over 9 minutes. T1 was 188 minutes and T1a was 150 minutes. A conversion ratio of p-DCB was 94.5%.

Step 2 Immediately after the completion of step 1, 0.32 kg (2.06 mol) of p-chlorobenzoic acid was injected. The temperature was raised from 245° C. to 255° C. at 0.8° C./minute over 12 minutes following step 1. The polymerization time (T2) of step 2 was 12 minutes.

After completion of step 2, the same operation as in Synthesis Example 1 was performed.

TABLE 1

| | | Synthesis Example 1 | Synthesis Example 2 | Synthesis Example 3 | Synthesis Example 4 | Synthesis Example 5 | Synthesis Example 6 | Synthesis Example 7 | Synthesis Example 8 | Synthesis Example 9 |
|---|---|---|---|---|---|---|---|---|---|---|
| p-DCB/Sulfidizing agent | Mol/100 mol | 100 | 100 | 100 | 99 | 103 | 103 | 101 | 96 | 100 |
| 4-Chlorobenzoic acid/Sulfidizing agent | Mol/100 mol | 3 | 3 | — | — | — | — | 1.75 | 10 | 3 |
| 2,5-Dichlorobenzoic acid/Sulfidizing agent | Mol/100 mol | — | — | 3 | 5 | — | — | — | — | — |
| Step 1 Time of polymerization time at 200° C. or higher and lower than 245° C. (T1a) | Minutes | 63 | 188 | 188 | 188 | 63 | 188 | 188 | 188 | 188 |
| Time of polymerization time at 230° C. or higher and lower than 245° C. | Minutes | 25 | 150 | 150 | 150 | 25 | 150 | 150 | 150 | 150 |
| Step 2 Polymerization time (T2) | Minutes | 117 | 12 | 12 | 12 | 117 | 12 | 12 | 12 | 12 |
| T1/T2 | | 0.5 | 15.7 | 15.7 | 15.7 | 0.5 | 15.7 | 15.7 | 15.7 | 15.7 |
| T1a/T2 | | 0.2 | 12.5 | 12.5 | 12.5 | 0.2 | 12.5 | 12.5 | 12.5 | 12.5 |
| T1 + T2 | Minutes | 180 | 200 | 200 | 200 | 180 | 200 | 200 | 200 | 200 |
| Carboxyl group content | μmol/g | 170 | 150 | 160 | 210 | 65 | 55 | 95 | 420 | 80 |
| Weight average molecular weight (Mw) | | 20,000 | 16,000 | 18,000 | 17,000 | 20,000 | 20,000 | 16,000 | 9,000 | 19,000 |
| Amount of volatile component | Mass % | 1.05 | 0.70 | 0.86 | 0.90 | 1.12 | 0.80 | 0.68 | 0.76 | 0.82 |
| Chlorine content | ppm | 1,500 | 1,900 | 2,300 | 2,500 | 4,000 | 4,400 | 3,100 | 3,400 | 3,800 |
| Tm | ° C. | 280 | 280 | 280 | 280 | 280 | 280 | 280 | 280 | 280 |

(B) Filler

Glass fibers: T-747H manufactured by Nippon Electric Glass Co., Ltd., length of 3 mm, average fiber diameter of 10.5 μm.

Carbon fibers: carbon fibers obtained by subjecting a copolymer containing polyacrylonitrile as a main component to spinning, firing treatment, and a surface oxidation treatment, applying polyglycerol polyglycidyl ether (epoxy equivalent of 140 g/eq.) as a sizing agent to continuous carbon fibers (total single yarn number: 24,000, single filament diameter: 7 μm, mass per unit length: 1.6 g/m, specific gravity: 1.8 g/cm$^3$, surface oxygen concentration [O/C]: 0.06, strand tensile strength: 4,880 MPa, strand tensile elastic modulus: 225 GPa) to control an adhesion amount to 1.0 mass %, followed by drying at 200° C. and further cutting into fibers each having an average fiber length of 6.0 mm using a rotary cutter.

The surface oxygen concentration ratio was determined by X-ray photoelectron spectroscopy in accordance with the following procedure, using carbon fibers after subjecting to a surface oxidation treatment. First, a carbon fiber bundle was cut into pieces of 20 mm in length, which were spread and arranged on a sample support stage made of copper, and then the atmosphere in a sample chamber was kept at 1×10$^{-8}$ Torr using AlKα1, 2 as an X-ray source. As a correction value of a peak occurring in association with charging during the measurement, kinetic energy value (K.E.) of a main peak of C1s was adjusted to 1,202 eV. A C1s peak area was determined by drawing a linear base line within 1,191 to 1,205 eV as K.E. An O1s peak area was determined by drawing a linear base line within 947 to 959 eV as K.E. From a ratio of the O1s peak area to the C1s peak area, a device specific sensitivity correction value was calculated as an atomic ratio. Using an X-ray photoelectron spectrometer, Model ES-200, manufactured by Kokusai Electric Inc., a sensitivity correction value was adjusted to 1.74.

(C) Olefin-Based Copolymer

Ethylene/glycidyl methacrylate=88/12 (mass %) copolymer (BONDFAST-E, manufactured by Sumitomo Chemical Company, Limited)

(D) Alkoxysilane Compound

β-(3,4-Epoxy cyclohexyl)ethyltrimethoxysilane (KBM303, manufactured by Shin-Etsu Chemical Co., Ltd.)

Examples 1 to 10, Comparative Examples 1 to 6

Materials other than a filler (B) were dry-blended in advance in the proportion shown in Table 2 or Table 3, and then fed in a feed section of a TEX30α type twin-screw extruder (L/D=30) manufactured by The Japan Steel Works, Ltd. Meanwhile, the filler (B) was fed from a side feeder of the twin-screw extruder in the proportion shown in Tables 2 or 3. Melt kneading was carried out under the conditions of a temperature of 320° C. and a rotational speed of 200 rpm. After melt kneading, the resin composition was discharged from the twin-screw extruder, pelletized by a strand cutter, and then subjected to hot-air drying at 120° C. overnight to obtain pellets of the resin composition.

A tensile test was performed under the following conditions. Using an injection molding machine (SE75DUZ-C250) manufactured by Sumitomo Heavy Industries, Ltd., each of ASTM No. 1 dumbbell test pieces for a tensile test was molded at a resin temperature of 310° C. and a mold temperature of 130° C. Using test pieces thus obtained, tensile strength was measured under the conditions of a span of 114 mm, a tension rate of 10 mm/minute, a temperature of 23° C., and relative humidity of 50% in accordance with ASTM D638. For a chemical resistance test, the same test piece was immersed in a long-life coolant (LLC) 50% solution and treated at 130° C. for 1,000 hours. Then, tensile strength was measured under the same conditions and a strength retention ratio to the tensile strength before immersion was measured.

A bending test was performed under the following conditions. Using the above injection molding machine, bending test pieces each measuring a length of 127 mm, a width of 12.7 mm, and a thickness of 6.35 mm were molded under the same molding conditions mentioned above. Using test pieces thus obtained, bending strength was measured under the conditions of a span of 100 mm, a crosshead rate of 3 mm/minute, a temperature of 23° C., and relative humidity of 50% in accordance with ASTM D790.

Weld strength test was performed under the following conditions. Using the above injection molding machine, ASTM No. 1 dumbbell test pieces each having a gate at both ends and also having a weld line in the vicinity of the center of the test piece were made under the same molding conditions mentioned above. Using test pieces, a tensile strength was measured under the conditions of a span of 114 mm, a tension rate of 10 mm/minute, a temperature of 23° C., and relative humidity of 50% in accordance with ASTM D638. The value of tensile strength obtained by this test is regarded as weld strength. For a chemical resistance test, the same test piece was immersed in an LLC 50% solution and treated at 130° C. for 1,000 hours. Then, tensile strength was measured under the same conditions and a strength retention ratio to the tensile strength before immersion was regarded as a weld strength retention ratio.

The measurement results of tensile strength, bending strength, and weld strength are shown in Tables 2 and 3.

TABLE 2

| | | | Example 1 | Example 2 | Example 3 | Example 4 | Example 5 | Example 6 | Example 7 | Example 8 |
|---|---|---|---|---|---|---|---|---|---|---|
| Type of PPS resin | | | PPS-1 | PPS-2 | PPS-3 | PPS-1 | PPS-2 | PPS-3 | PPS-4 | PPS-4 PPS-6 |
| Mixing amount | PPS resin | Parts by mass | 100 | 100 | 100 | 100 | 100 | 100 | 100 | PPS-4: 50 Parts by mass PPS-6: 50 Parts by mass |
| | Filler (Glass fibers) | Parts by mass | 67 | 67 | 67 | | | | | |
| | Filler (Carbon fibers) | Parts by mass | | | | 67 | 67 | 67 | 67 | 67 |
| | Olefin-based copolymer | Parts by mass | | | | | | | | |
| | Alkoxysilane compound | Parts by mass | | | | | | | | |
| Mechanical properties | Tensile strength | MPa | 160 | 170 | 165 | 180 | 190 | 185 | 195 | 175 |
| | Bending strength | MPa | 210 | 220 | 215 | 230 | 220 | 235 | 245 | 220 |
| | Weld strength | MPa | 105 | 110 | 105 | 115 | 110 | 115 | 120 | 110 |
| | Tensile strength after LLC treatment | MPa | 120 | 135 | 125 | 150 | 165 | 160 | 175 | 130 |
| | Tensile strength retention ratio after LLC treatment | % | 75 | 79 | 76 | 83 | 87 | 86 | 90 | 74 |
| | Weld strength after LLC treatment | MPa | 85 | 90 | 85 | 100 | 100 | 105 | 110 | 90 |
| | Weld strength retention ratio after LLC treatment | % | 81 | 82 | 81 | 87 | 91 | 91 | 92 | 82 |

TABLE 3

|  |  |  | Example 9 | Example 10 | Comparative Example 1 | Comparative Example 2 | Comparative Example 3 | Comparative Example 4 | Comparative Example 5 | Comparative Example 6 |
|---|---|---|---|---|---|---|---|---|---|---|
| Type of PPS resin |  |  | PPS-3 | PPS-3 | PPS-5 | PPS-5 | PPS-6 | PPS-7 | PPS-8 | PPS-9 |
| Mixing amount | PPS resin | Parts by mass | 100 | 100 | 100 | 100 | 100 | 100 | 100 | 100 |
|  | Filler (Glass fibers) | Parts by mass |  |  |  | 67 |  |  |  |  |
|  | Filler (Carbon fibers) | Parts by mass | 67 | 67 |  | 67 | 67 | 67 | 67 | 67 |
|  | Olefin-based copolymer | Parts by mass | 2.5 |  |  |  |  |  |  |  |
|  | Alkoxysilane compound | Parts by mass |  | 0.8 |  |  |  |  |  |  |
| Mechanical properties | Tensile strength | MPa | 210 | 215 | 130 | 150 | 155 | 140 | 110 | 155 |
|  | Bending strength | MPa | 260 | 260 | 180 | 200 | 205 | 190 | 160 | 205 |
|  | Weld strength | MPa | 130 | 130 | 90 | 100 | 105 | 95 | 80 | 100 |
|  | Tensile strength after LLC treatment | MPa | 190 | 195 | 75 | 90 | 85 | 90 | 100 | 95 |
|  | Tensile strength retention ratio after LLC treatment | % | 90 | 91 | 58 | 60 | 55 | 64 | 91 | 61 |
|  | Weld strength after LLC treatment | MPa | 120 | 120 | 50 | 60 | 55 | 60 | 70 | 60 |
|  | Weld strength retention ratio after LLC treatment | % | 92 | 92 | 56 | 60 | 52 | 63 | 88 | 60 |

PAS having a carboxyl group content of 100 to 400 µmol/g and also having a weight average molecular weight of 10,000 to 100,000 was melt-kneaded with a filler, whereby, we found that mechanical properties and chemical resistance are significantly improved, and thus it is particularly effective for improvement in chemical resistance at the weld section.

The invention claimed is:

1. A polyarylene sulfide resin composition comprising:
(A) a polyarylene sulfide resin consisting of repeating units of the formula -(—Ar—S—)- and having a carboxyl group content of more than 100 µmol/g and less than 400 µmol/g, and a weight average molecular weight of 10,000 or more and less than 100,000; and
(B) a filler,
wherein Ar is a unit selected from the group consisting of units represented by the following formulas (A) to (K), herein R1 and R2 are substituents selected from hydrogen, an alkyl group, an alkoxy group, a halogen group, and a carboxyl group, and R1 and R2 may be the same or different;

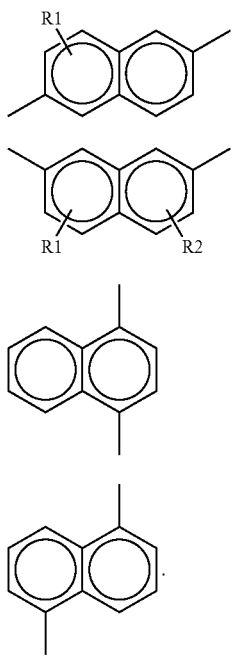

2. The polyarylene sulfide resin composition according to claim 1, wherein the filler (B) is a fibrous inorganic filler.

3. The polyarylene sulfide resin composition according to claim 1, wherein the polyarylene sulfide resin (A) is a polyarylene sulfide resin in which an amount of a volatile component volatilizing when melting with heating under vacuum at 320° C. for 2 hours is 1.0 mass % or less.

4. The polyarylene sulfide resin composition according to claim 1, which includes the filler (B) in an amount of 10 to 250 parts by mass based on 100 parts by mass of the polyarylene sulfide resin (A).

5. The polyarylene sulfide resin composition according to claim 1, further comprising:

(C) an olefin-based copolymer in an amount of 1 to 30 parts by mass based on 100 parts by mass of the polyarylene sulfide resin (A).

6. The polyarylene sulfide resin composition according to claim 5, wherein the olefin-based copolymer (C) is an olefin-based copolymer having at least one functional group selected from the group consisting of an epoxy group, a carboxyl group, an acid anhydride group, an amino group, a hydroxyl group, and a mercapto group.

7. The polyarylene sulfide resin composition according to claim 1, further comprising:

(D) an alkoxysilane compound in an amount of 0.05 to 5 parts by mass based on 100 parts by mass of the polyarylene sulfide resin (A).

8. The polyarylene sulfide resin composition according to claim 2, wherein the polyarylene sulfide resin (A) is a polyarylene sulfide resin in which an amount of a volatile component volatilizing when melting with heating under vacuum at 320° C. for 2 hours is 1.0 mass % or less.

9. The polyarylene sulfide resin composition according to claim 2, which includes the filler (B) in an amount of 10 to 250 parts by mass based on 100 parts by mass of the polyarylene sulfide resin (A).

10. The polyarylene sulfide resin composition according to claim 3, which includes the filler (B) in an amount of 10 to 250 parts by mass based on 100 parts by mass of the polyarylene sulfide resin (A).

11. The polyarylene sulfide resin composition according to claim 2, further comprising:

(C) an olefin-based copolymer in an amount of 1 to 30 parts by mass based on 100 parts by mass of the polyarylene sulfide resin (A).

12. The polyarylene sulfide resin composition according to claim 3, further comprising:

(C) an olefin-based copolymer in an amount of 1 to 30 parts by mass based on 100 parts by mass of the polyarylene sulfide resin (A).

13. The polyarylene sulfide resin composition according to claim 4, further comprising:

(C) an olefin-based copolymer in an amount of 1 to 30 parts by mass based on 100 parts by mass of the polyarylene sulfide resin (A).

* * * * *